(12) United States Patent
Ueda et al.

(10) Patent No.: US 7,123,556 B2
(45) Date of Patent: Oct. 17, 2006

(54) MULTI-LAYERED INFORMATION RECORDING MEDIUM WITH SPARE DEFECT MANAGEMENT AREAS

(75) Inventors: Hiroshi Ueda, Nara (JP); Motoshi Ito, Osaka (JP); Takashi Ishida, Kyoto (JP); Yoshikazu Yamamoto, Osaka (JP); Mamoru Shoji, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 758 days.

(21) Appl. No.: 10/339,630

(22) Filed: Jan. 9, 2003

(65) Prior Publication Data

US 2003/0137910 A1    Jul. 24, 2003

(30) Foreign Application Priority Data

Jan. 22, 2002  (JP)  ............................. 2002-013491
Mar. 1, 2002   (JP)  ............................. 2002-056635

(51) Int. Cl.
  *G11B 7/00*  (2006.01)
  *G11B 5/09*  (2006.01)
(52) U.S. Cl. .................... 369/47.14; 369/94; 711/4
(58) Field of Classification Search ............ 369/47.14, 369/94; 711/112, 4
  See application file for complete search history.

(56) References Cited

U.S. PATENT DOCUMENTS 5,111,444 A * 5/1992 Fukushima et al. ...... 369/53.17
5,404,357 A    4/1995 Ito et al. .................... 371/21.2
5,835,930 A * 11/1998 Dobbek .......................... 711/4
5,914,928 A *  6/1999 Takahashi ................. 369/47.14
6,651,135 B1 * 11/2003 Ando et al. ................. 711/112
6,665,690 B1 * 12/2003 Kimura et al. .............. 707/205
6,795,381 B1 *  9/2004 Ando et al. .............. 369/30.03

FOREIGN PATENT DOCUMENTS

| EP | 1 056 089 A1 | 11/2000 |
| JP | 07-121993 | 5/1995 |
| JP | 2000-195178 | 7/2000 |
| JP | 2000-285607 | 10/2000 |
| JP | 2001-014808 | 1/2001 |
| WO | 00/07186 | 2/2000 |
| WO | 01/54119 A2 | 7/2001 |

OTHER PUBLICATIONS

European Search Report, Application No. EP 03 00 0696, dated Feb. 21, 2003.
Japanese Office Action for corresponding Application No. 2003-001589 dated Jan. 27, 2006.

* cited by examiner

*Primary Examiner*—Gautam R. Patel
(74) *Attorney, Agent, or Firm*—Renner, Otto, Boisselle & Sklar, LLP

(57) ABSTRACT

A multi-layered information recording medium comprising a plurality of recording layers, a user data area for recording user data, provided in at least two of the plurality of recording layers, and a defect list storing area for storing a defect list. When at least one defective area is detected in the user data area, the defect list is used to manage the at least one defective area.

12 Claims, 24 Drawing Sheets

First recording layer 41

Second recording layer 42
First recording layer 41

Reproduction direction

Second recording layer 44

First recording layer 43

Second recording layer 44
First recording layer 43

Reproduction direction

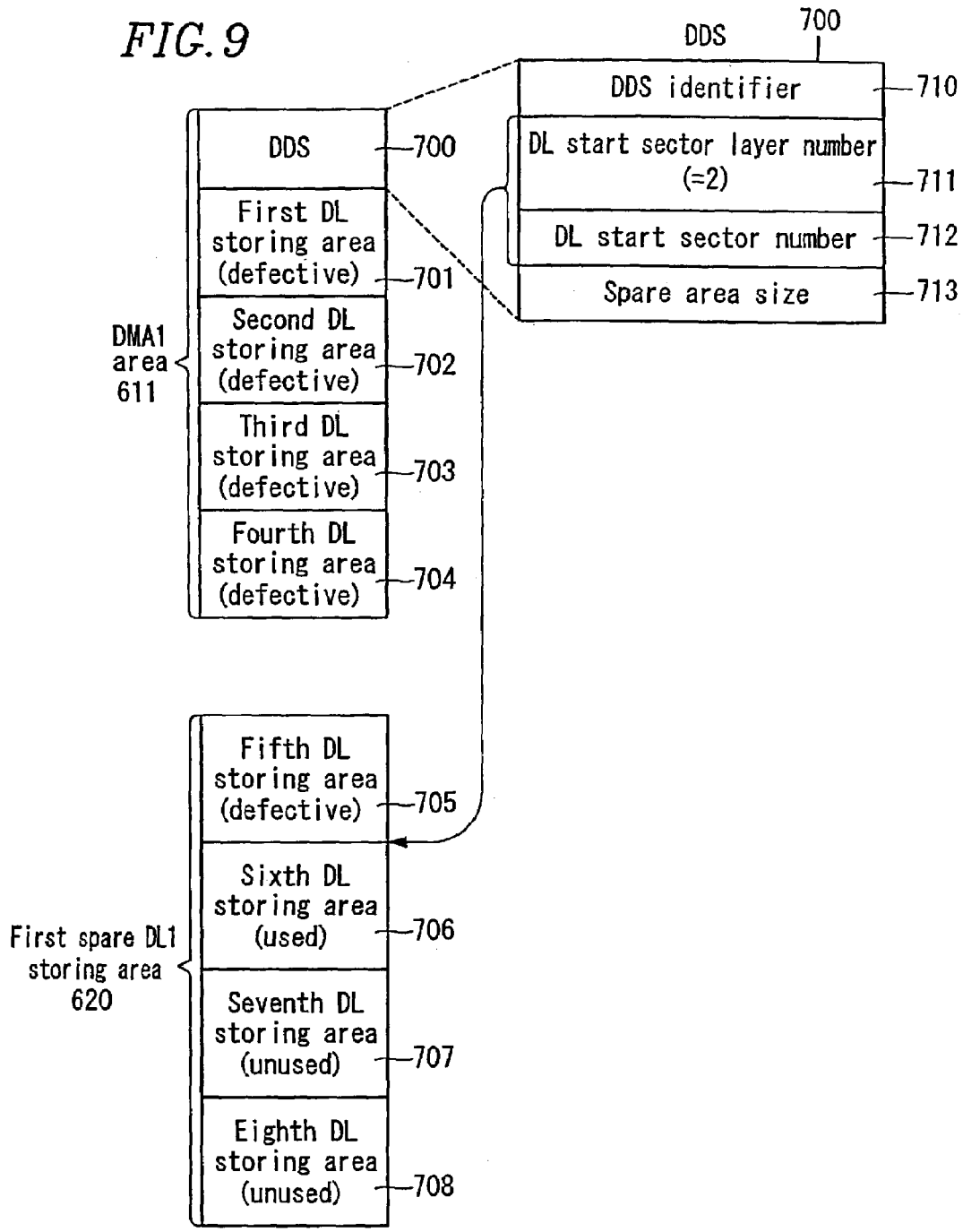

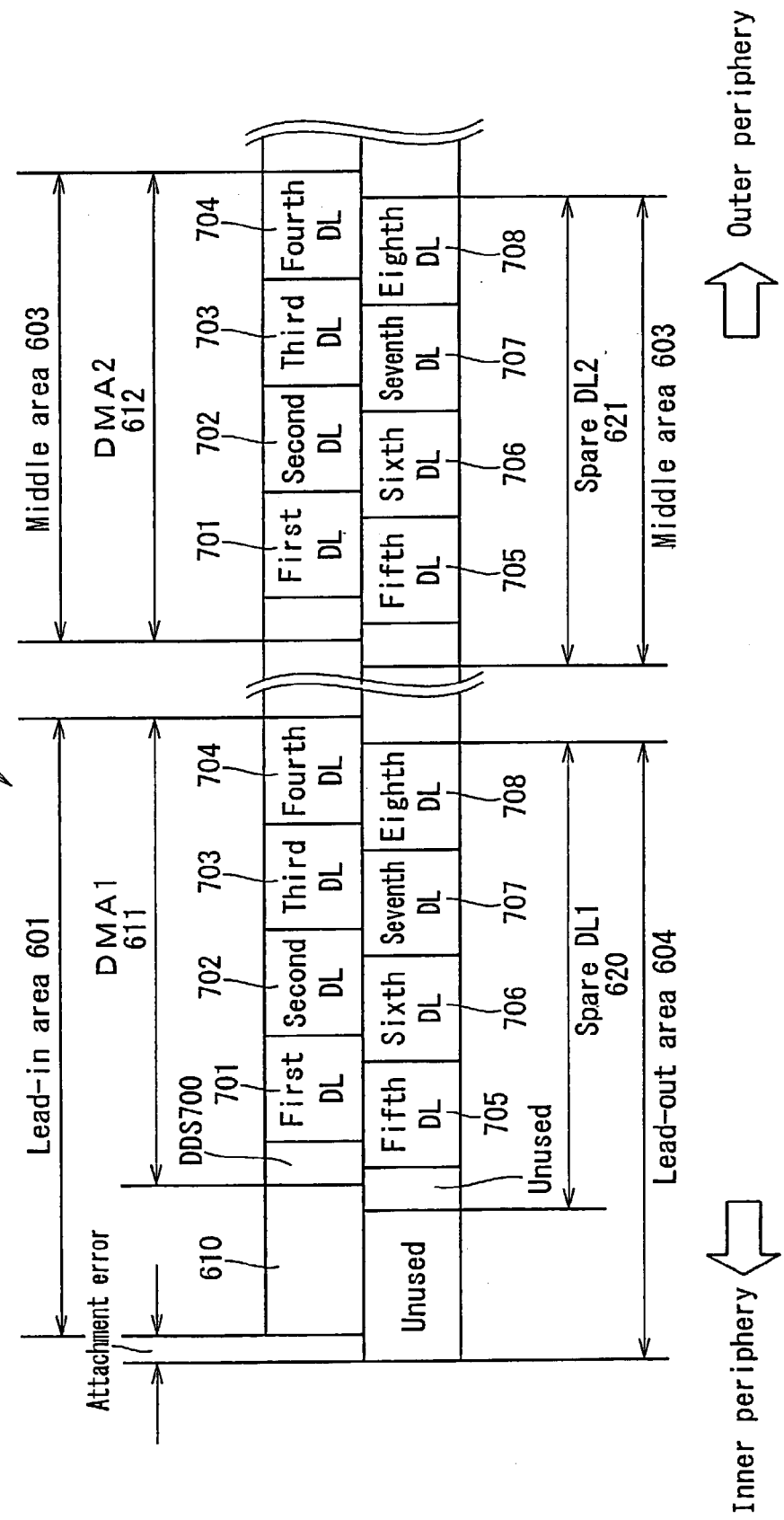

MULTI-LAYERED INFORMATION RECORDING MEDIUM WITH SPARE DEFECT MANAGEMENT AREAS

BACKGROUND OF THE INVENTION

1. Field of the Invention

The present invention relates to a multi-layered information recording medium comprising at least two recording layers, a reproduction apparatus, a recording apparatus for use with the multi-layered information recording medium, a reproduction method for reproducing information from the multi-layered information recording medium, and a recording method for recording information in the multi-layered information recording medium.

2. Description of the Related Art

A typical information recording medium which has a sector structure is an optical disc. In recent years, AV data, such as audio data, video data, and the like, has been digitalized, and accordingly, an optical disc having a higher recording density and a larger capacity has been demanded. Providing a plurality of recording layers is useful in increasing the capacity of a disc. For example, the capacity of a read-only DVD has been increased about two times by providing two recording layers to the DVD.

FIG. 1 shows a structure of a typical optical disc medium 1 including a track 2 and sectors 3. On the optical disc medium 1, the track 2 is turned multiple times in a spiral arrangement. The track 2 is divided into a large number of small sectors 3. Regions formed on the disc medium 1 are roughly classified into a lead-in area 4, a user data area 8, and a lead-out area 6. Recording or reproduction of user data is performed on the user data area 8. The lead-in area 4 and the lead-out area 6 are provided as margins such that an optical head (not shown) can appropriately follow a track even if overrunning of the optical head occurs when the optical head approaches an end portion of the user data area 8. The lead-in area 4 includes a disc information area which stores parameters necessary for accessing the disc medium 1. Physical sector numbers (hereinafter, abbreviated as "PSN(s)") are assigned to the sectors 3 in order to identify the respective sectors 3. Further, consecutive logical sector numbers (hereinafter, abbreviated as "LSN(s)") which start with 0 are assigned to the sectors 3 included in the user data area 8 such that a high level apparatus (not shown) such as a host computer identifies the respective sectors 3.

FIG. 2 illustrates a principle of reproduction of data from a read-only optical disc 30 having two recording layers. Here, production of the read-only optical disc 30 of FIG. 2 is briefly described. Grooves are formed on transparent substrates 31 and 32 so as to form spiral tracks. Over the grooved surfaces of the substrates 31 and 32, recording layers 33 and 34 are attached so as to cover the grooved surfaces, respectively. The substrates 31 and 32 are attached together so as to sandwich a transparent light-curable resin 35 between the recording layers 33 and 34, thereby obtaining a single read-only optical disc 30. In this specification, for convenience of description, in FIG. 2, a recording layer 34 closer to the incoming laser light 38 is referred to as a first recording layer 34; whereas the other recording layer 33 is referred to as a second recording layer 33. The thickness and composition of the first recording layer 34 are adjusted such that the first recording layer 34 reflects a half of the incoming laser light 38 and transmits the other half of the incoming laser light 38. The thickness and composition of the second recording layer 33 are adjusted such that the second recording layer 33 reflects all of the incoming laser light 38. An objective lens 37 for converging the laser light 38 is moved toward or away from the read-only optical disc 30 such that the convergence point (beam spot) 36 of the laser light 38 is placed on the first recording layer 34 or the second recording layer 33.

FIGS. 3A, 3B, 3C and 3D show tracks of two recording layers 41 and 42 of a read-only DVD, which are called parallel paths, and the reproduction direction and sector numbers. FIG. 3A shows a spiral groove pattern of the second recording layer 42. FIG. 3B shows a spiral groove pattern of the first recording layer 41. FIG. 3C shows the reproduction direction in user data areas 8 provided on the recording layers 41 and 42. FIG. 3D shows sector numbers assigned to the recording layers 41 and 42.

Now, consider the read-only DVD disc is rotated clockwise when it is viewed from the back face side of the disc in the direction along which laser light comes onto the disc, i.e., when it is viewed from the back side of the sheets of FIGS. 3A and 3B. In this case, the laser light moves along the track 2 from the inner periphery to the outer periphery of the recording layers 41 and 42. In the case where user data is sequentially reproduced along the reproduction direction shown in FIG. 3C, reproduction is first performed from the innermost periphery to the outermost periphery of the user data area 8 of the first recording layer 41. Then, reproduction is performed from the innermost periphery to the outermost periphery of the user data area 8 of the second recording layer 42. The user data areas 8 of the first and second recording layers 41 and 42 are sandwiched by the lead-in area 4 and the lead-out area 6 such that an optical head can appropriately follow the track 2 even if overrunning of the optical head occurs. As shown in FIG. 3D, the PSNs and LSNs of each of the recording layers 41 and 42 are incrementally assigned along the reproduction direction. The PSNs do not necessarily need to start with 0 in view of convenience of disc formation. Further, the PSNs do not necessarily need to be continuously assigned between the first and second recording layers 41 and 42 (for example, a value corresponding to the layer number may be provided at the first location of each sector number). As LSNs, consecutive numbers which start with 0 are assigned to all of the user data areas 8 included in the optical disc. That is, in the user data area 8 of the first recording layer 41, the LSN at the innermost periphery is 0, and increases by ones toward the outermost perimeter. The LSN at the innermost periphery of the user data area 8 of the second recording layer 42 is a number obtained by adding 1 to the maximum LSN of the first recording layer 41. The LSN of the second recording layer 42 also increments by ones toward the outermost perimeter.

FIGS. 4A, 4B, 4C and 4D show tracks of two recording layers 43 and 44 of a read-only DVD, which is called an opposite path arrangement, and the reproduction direction and sector numbers. FIG. 4A shows a spiral groove pattern of the second recording layer 44. FIG. 4B shows a spiral groove pattern of the first recording layer 43. FIG. 4C shows the reproduction direction in user data areas 8 provided on the recording layers 43 and 44. FIG. 4D shows sector numbers assigned to the recording layers 43 and 44.

Now, consider the read-only DVD disc is rotated clockwise when it is viewed from the back face side of the disc in the direction along which laser light comes onto the disc, i.e., when it is viewed from the back side of the sheets of FIGS. 4A and 4B. In this case, the laser light moves along the track 2 from the inner periphery to the outer periphery in the first recording layer 43, but from the outer periphery to the inner periphery in the second recording layer 44. In the case where user data is sequentially reproduced along the reproduction direction shown in FIG. 4C, reproduction is first performed from the innermost periphery to the outermost periphery of the user data area 8 of the first recording layer 43, and then, reproduction is performed from the outermost periphery to the innermost periphery of the user data area 8 of the second recording layer 44. The user data area 8 of the first recording layer 43 is sandwiched by the lead-in area 4 and a middle area 7 such that an optical head can appropriately follow the track 2 even if overrunning of the optical head occurs. The user data area 8 of the second recording layer 44 is sandwiched by the middle area 7 and the lead-out area 6. The function of the middle area 7 is the same as that of the lead-out area 6. As shown in FIG. 4D, the PSNs and LSNs of each of the recording layers 43 and 44 are incrementally assigned along the reproduction direction as in the above-described parallel paths, except that the relationship between the sector numbers and the radial direction is changed because the spiral direction of the track 2 of the second recording layer 44 is inverse to the spiral direction of the track 2 of the first recording layer 43. In the user data area 8 of the first recording layer 43, the LSN is 0 at the innermost periphery, and increments by ones toward the outer periphery. The LSN at the outermost periphery in the user data area 8 of the second recording layer 44 is a number obtained by adding 1 to the maximum LSN in the user data area 8 of the first recording layer 43, and increments by ones toward the innermost perimeter.

Above, read-only optical discs have been described. Now, features specific to a rewritable optical disc are described. Such features result from the fact that requirements on a margin for a recording operation are more severe than that for a reproduction operation.

FIG. 5A shows an area layout of a typical rewritable disc 45. The rewritable disc 45 includes only one recording layer. A lead-in area 4 of the rewritable disc 45 includes a disc information area 10 and an OPC (Optimum Power Calibration) area 11, and a defect management area 12. The lead-out area 6 includes another defect management area 12. A user data area 8 and a spare area 13 are provided between a lead-in area 4 and a lead-out area 6.

A disc information area 10 stores disc information regarding a parameter(s) or a format necessary for recording/ reproduction of data of the optical disc. The disc information area 10 is also included in a read-only optical disc, but the disc information area 10 of the read-only optical disc includes nothing important other than a format identifier used for identifying the optical disc. On the other hand, in a rewritable optical disc, specific recommended values for the characteristics of the laser light used for recording, such as laser power, pulse width, and the like, are stored for each generated mark width. The disc information area 10 is a read-only area in which information is typically written at the time of production of the disc. In the rewritable disc 45, pits are formed in the disc surface as in a DVD-ROM or a CD-ROM. (There is a recording principle different from such a "pit" recording principle. For example, in a CD-RW, information is embedded in a meandering pattern (called "wobble") of a groove.)

The OPC area 11 is provided for optimally adjusting the recording power of laser light. A disc manufacturer stores recommended laser parameters for a recording operation in the disc information area 10. However, a laser element used by the disc manufacturer for obtaining the recommended values is different from a laser element incorporated in an optical disc drive apparatus, in respect to laser characteristics, such as the wavelength, the rising time of the laser power, and the like. Further, even a laser element of the same optical disc drive, the laser characteristics thereof vary because of a variation of the ambient temperature or deterioration which occurs over time. Thus, in an actual case, test recording is performed on the OPC area 11 while increasingly and decreasingly changing the laser parameters stored in the disc information area 10 so as to obtain an optimum recording power.

A defect management area 12 and a spare areas 13 are provided for defect management, i.e., provided for replacing a sector of the user data area 8 in which recording/reproduction cannot be appropriately performed (referred to as a "defective sector") with another well-conditioned (i.e., sufficiently usable) sector. In a rewritable single-layer optical disc, such as a 650 MB phase-change optical disc (called a PD) defined in the ECMA-240 format, or the like, defect management is generally performed.

The spare area 13 includes a sector for replacing a defective sector (referred to as a spare sector). A sector which is already employed in place of a defective sector is referred to as a replacement sector. In a DVD-RAM, spare areas 13 are placed at two positions, one at the inner periphery and the other at the outer periphery of the user data area 8. In the above-described PD, spare areas 13 are provided at 10 positions, and their arrangement varies depending on the medium. In the example of FIG. 5, for the sake of simplicity, a spare area 13 is provided at only one portion at the outer periphery of the user data area 8.

The defect management area 12 includes: a disc definition structure (DDS) storing area 20 storing a format designed for defect management, which includes the size of the spare area 13 and the position where the spare area 13 is placed; a defect management sector (DMS) storing area 21 storing data for managing the defect of the defect management area 12 itself; a defect list (DL) storing area 22 storing a list of defects containing the positions of defective sectors and the positions of replacement sectors; and a spare defective list (spare DL) storing area 23 which is used to replace the defect list (DL) storing area 22 when it is not usable. In view of robustness, many discs are designed based on a specification such that each of the inner perimeter portion and outer perimeter portion of a disc has one defect management area 12, and each defect management area 12 duplicately stores the same contents, i.e., the defect management areas 12 of the disc have the four copies of the same contents in total.

FIG. 5B shows data stored in a DMS 21. The data stored in the DMS 21 are the number of DL sectors 30 which indicates the number of sectors storing a defect list, and a list of DL sector addresses 31 each of which indicates the address of a sector. For the sake of simplicity, DL storing areas 22 each are herein assumed to include only one sector. If it is determined that a DL storing area 22 is defective when updating a defect list because of detection of a new defective sector, the following spare DL storing area 23 is used to record the defect list. In this case, the DL sector address list 31 is updated so as to indicate the sector address of the spare DL storing 23.

FIG. 5C shows data stored in a DL storing area 22. The data stored in the DL storing area 22 are a DL identifier 32 which is a unique identifier for identifying a defect list, and the number of defective sectors 33 registered on the defect list. The DL storing area 22 further includes a plurality of defect entry areas 34 each including the address of a defective sector and the address of a replacement sector. It is now assumed that there are n defects registered (n is an integer greater than or equal to 3). In this case, the number of defective sectors 33 indicates n.

A first defect entry area 34 stores a replacement status 40, a defective sector address 41, and a replacement sector address 42. In other words, a single defect entry area stores information relating to a process for replacing a single defective sector. The replacement status 40 is a flag indicating whether or not replacement is applied to a defective sector. When replacement is performed, a value 0 is set in the replacement status 40. When replacement is not applied, a value 1 is set in the replacement status 40. When the value 1 is set in the replacement status 40, an optical disc drive apparatus accesses a defective sector. In this case, even if an error occurs in a read out process, the error is ignored and the read out process is continued while data contains the error. Such a process may be applied for recording and reproduction of video and audio data requiring continuous recording or reproduction. This is because interruptions in reproduction of video or audio due to replacement of a defective area with a distant spare area appears more significant than disturbances in video or audio due to the erroneous data itself. The defective sector address 41 contains the address of a sector which is determined to be defective. The replacement sector address 42 contains the address of a sector in a spare area 13, which sector replaces a defective sector indicated by the defective sector address 41. The n defect entry areas are arranged in ascending order of the address of a defective sector.

As described above, defect management is essential for rewritable optical discs to obtain substantially the same data reliability as that of read-only optical discs.

Although there are read-only optical discs having a plurality of recording layers, all existing rewritable optical discs have only a single recording layer. The above-described defect management for a rewritable optical disc is directed to management of only one recording layer.

If defect management as described above was simply applied to an optical disc having a plurality of recording layers, a defect management area would be provided for each recording layer. A defect management is separately performed for each recording layer. A typical recording/reproduction apparatus for rewritable optical discs transfers a defect list into a memory within the apparatus when the apparatus is actuated (initial process). This is because defect management information can be accessed at high speed, which is constantly referenced in recording and reproduction of user data. Therefore, when a recording/reproduction apparatus handles an optical disc having a plurality of recording layers, the apparatus needs to read all defect management areas in all recording layers when loading a disk into the apparatus. This poses a problem such that it takes a long time before starting actual recording or reproduction of a disc. Moreover, defect management is separately performed for each recording layer, and therefore, if a finite defect list storing area is exhausted in a certain recording layer, any defect list storing areas of other recording layers are not available for that exhausted recording layer. This poses a problem such that defect list storing areas cannot be efficiently used.

As used herein, the term "initial process" for an optical disc refers to a process in which defect management information or the like is read out before recording or reproduction user data or the like on the disc when a recording/reproduction apparatus is actuated.

SUMMARY OF THE INVENTION

According to one aspect of the present invention, a multi-layered information recording medium comprises: a plurality of recording layers; a user data area for recording user data, provided in at least two of the plurality of recording layers; and a defect list storing area for storing a defect list, wherein when at least one defective area is detected in the user data area, the defect list is used to manage the at least one defective area.

In one embodiment of this invention, the multi-layered information recording medium may further comprise a defect list location information storing area for storing defect list location information indicating the location of the defect list storing area. The defect list location information storing area may be provided in one of the plurality of recording layers which is predetermined as a reference layer.

In one embodiment of this invention, the reference layer may be one of the plurality of recording layers which is located at a predetermined distance from the data read-out surface of the multi-layered information recording medium.

In one embodiment of this invention, the reference layer may be one of the plurality of recording layers which is located at the shortest distance from the data read-out surface of the multi-layered information recording medium.

In one embodiment of this invention, the reference layer may be one of the plurality of recording layers which is located at the longest distance from the data read-out surface of the multi-layered information recording medium.

In one embodiment of this invention, the defect list may indicate the location of the detected at least one defective area by a layer number for distinguishing the plurality of recording layer from each other and an intralayer address for indicating a position in each of the plurality of recording layers.

In one embodiment of this invention, the defect list storing area may be provided in one of the plurality of recording layer, and the defect list location information may indicate the location of the defect list storing area by a layer number for distinguishing the plurality of recording layer from each other and an intralayer address for indicating a position in each of the plurality of recording layers.

In one embodiment of this invention, the multi-layered information recording medium may further comprise a spare area containing at least one replacement area. When at least one defective area is detected in the user data area, the at least one replacement area may be used in place of the at least one defective area.

In one embodiment of this invention, when the defective area is replaced with the replacement area, the defect list may indicate the location of the defective area and the location of the replacement area by respective layer numbers for distinguishing the plurality of recording layers from each other and respective intralayer addresses for indicating a position in each of the plurality of recording layers.

In one embodiment of this invention, the defect list storing area may be provided one of the plurality of recording layers. The multi-layered information recording medium may further comprise an additional defect list storing area for storing a defect list having the same contents as the contents of the defect list stored in the defect list storing area. The additional defect list storing area may be provided in another one of the plurality of recording layers.

In one embodiment of this invention, the multi-layered information recording medium may further comprise a first defect list location information storing area for storing first defect list location information indicating the location of the defect list storing area, and a second defect list location information storing area for storing a second defect list location information indicating the location of the additional defect list storing area. The first defect list location information storing area may be provided in the same recording layer as that in which the defect list storing area is provided, and the second defect list location information storing area may be provided in the same recording layer as that in which the additional defect list storing area is provided.

In one embodiment of this invention, the recording layer in which the defect list storing area is provided may comprise a first defect management area containing the defect list storing area and the first defect list location information storing area. The recording layer in which the additional defect list storing area may be provided comprises a second defect management area containing the additional defect list storing area and the second defect list location information storing area. Logical addresses may be assigned to the user data area. An area of the user data area to which the smallest logical address is assigned is provided in the recording layer in which the defect list storing area may be provided. An area of the user data area to which the greatest logical address is assigned may be provided in the recording layer in which the additional defect list storing area is provided. The first defect management area may be adjacent to the area to which the smallest logical address is assigned. The second defect management area may be adjacent to the area to which the greatest logical address is assigned.

According to another aspect of the present invention, a multi-layered information recording medium comprises: a plurality of recording layers; a user data area for recording user data, provided in at least two of the plurality of recording layers; a defect management area provided in at least one of the plurality of recording layers; and a spare defect list storing area provided in another one of the plurality of recording layers. The defect management area contains a plurality of first defect list storing areas for storing a defect list, wherein when at least one defective area is detected in the user data area, the defect list is used to manage the at least one defective area. The spare defect list storing area contains a plurality of second defect list storing areas capable of being used in place of the plurality of first defect list storing areas when none of the plurality of first defect list storing areas is usable.

In one embodiment of this invention, the defect management area and the spare defect list storing area may be located at substantially the same radial positions in the multi-layered information recording medium.

In one embodiment of this invention, the defect management area may further comprise a defect list location information storing area for storing defect list location information indicating the location of an area storing the defect list among the plurality of first defect list storing areas and the plurality of second spare defect list storing areas.

According to another aspect of the present invention, an apparatus for reproducing information recorded in a multi-layered information recording medium is provided. The multi-layered information recording medium comprises: a plurality of recording layers; a user data area for recording user data, provided in at least two of the plurality of recording layers; and a defect list storing area for storing a defect list, wherein when at least one defective area is detected in the user data area, the defect list is used to manage the at least one defective area. The apparatus comprises: an optical head section capable of optically reading the information recorded in the multi-layered information recording medium from one side of the multi-layered information recording medium; and a control section for controlling defect management using the optical head section. The defect management comprises the steps of: reproducing the defect list stored in the defect list storing area; and reproducing the user data recorded in the user data area based on the reproduced defect list.

In one embodiment of this invention, the multi-layered information recording medium may further comprise: a defect list location information storing area for storing defect list location information indicating the location of the defect list storing area, wherein the defect list location information storing area is provided in one of the plurality of recording layers which is predetermined as a reference layer, the defect management further comprises identifying the location of the defect list storing area by reproducing the defect list location information stored in the defect list location information storing area.

In one embodiment of this invention, the multi-layered information recording medium may further comprise: a spare area for containing at least one replacement area, wherein when at least one defective area is detected in the user data area, the at least one replacement area may be used in place of the at least one defective area. The defect list may indicate that a defective area present in the user data area is replaced with the replacement area contained in the spare area. The step of reproducing the user data may comprise reproducing user data from the replacement area indicated by the defect list instead of the defective area indicated by the defect list.

According to another aspect of the present invention, an apparatus for recording information in a multi-layered information recording medium is provided. The multi-layered information recording medium comprises: a plurality of recording layers; a user data area for recording user data, provided in at least two of the plurality of recording layers; and a defect list storing area for storing a defect list, wherein when at least one defective area is detected in the user data area, the defect list is used to manage the at least one defective area. The apparatus comprises: an optical head section capable of optically recording the information in the multi-layered information recording medium from one side of the multi-layered information recording medium; and a control section for controlling defect management using the optical head section. The defect management comprises the steps of: determining whether or not a defective area is present in the user data area during recording of user data in the user data area; and updating the defect list so as to manage a defective area when it is determined that the defective area is present in the user data area.

In one embodiment of this invention, the multi-layered information recording medium may further comprise an additional defect list storing area capable of being used in place of the defect list storing area when the defect list storing area is unusable. The defect management may further comprise recording a defect list having the same contents as the contents of a defect list stored in the defect list storing area to the additional defect list storing area, when the defect list storing area is unusable.

In one embodiment of this invention,the multi-layered information recording medium may further comprise: a defect list location information storing area for storing defect list location information indicating the location of a defect list. The defect list location information storing area may be provided in one of the plurality of recording layers which is predetermined as a reference layer. The defect management may further comprise updating the defect list location information so that the defect list location information indicates the additional defect list storing area, when the additional defect list storing area is used in place of the defect list storing area.

In one embodiment of this invention, the multi-layered information recording medium may further comprise: a defect management area provided in one of the plurality of recording layers; and a spare defect list storing area provided in another one of the plurality of recording layer. The defect management area may comprise a plurality of defect list storing areas, the spare defect list storing area comprises a plurality of additional defect list storing areas, the defect list storing area is one of the plurality of defect list storing areas, the additional defect list storing area is one of the plurality of additional defect list storing area, and when none of the plurality of defect list storing areas is usable, the additional defect list storing area is used in place of the defect list storing area.

In one embodiment of this invention, the defect list storing area may be provided in one of the plurality of recording layers, and the additional defect list storing area may be provided in the same recording layer as that in which the defect list storing area is provided.

In one embodiment of this invention, the defect list storing area may be provided in one of the plurality of recording layers, and the additional defect list storing area may be provided in another one of the plurality of recording layers.

In one embodiment of this invention, the multi-layered information recording medium may further comprise: a spare area for containing at least one replacement area, wherein when at least one defective area is detected in the user data area, the at least one replacement area may be used in place of the at least one defective area. The defect management may further comprise replacing the defective area present in the user data area with the replacement area contained in the spare area.

According to another aspect of the present invention, a method for reproducing information recorded in a multi-layered information recording medium is provided. The multi-layered information recording medium comprises: a plurality of recording layers; a user data area for recording user data, provided in at least two of the plurality of recording layers; and a defect list storing area for storing a defect list, wherein when at least one defective area is detected in the user data area, the defect list is used to manage the at least one defective area. The method comprises the steps of: reproducing the defect list stored in the defect list storing area; and reproducing the user data recorded in the user data area based on the reproduced defect list.

In one embodiment of this invention, the multi-layered information recording medium may further comprise: a defect list location information storing area for storing defect list location information indicating the location of the defect list storing area. The defect list location information storing area may be provided in one of the plurality of recording layers which is predetermined as a reference layer. The method may further comprise identifying the location of the defect list storing area by reproducing the defect list location information stored in the defect list location information storing area.

In one embodiment of this invention, the multi-layered information recording medium may further comprise: a spare area for containing at least one replacement area, wherein when at least one defective area is detected in the user data area, the at least one replacement area may be used in place of the at least one defective area. The defect list may indicate that a defective area present in the user data area is replaced with the replacement area contained in the spare area. The step of reproducing the user data may comprise reproducing user data from the replacement area indicated by the defect list instead of the defective area indicated by the defect list.

According to another aspect of the present invention, a method for recording information in a multi-layered information recording medium is provided. The multi-layered information recording medium may comprise: a plurality of recording layers; a user data area for recording user data, provided in at least two of the plurality of recording layers; and a defect list storing area for storing a defect list, wherein when at least one defective area is detected in the user data area, the defect list is used to manage the at least one defective area. The method comprises the steps of: determining whether or not a defective area is present in the user data area during recording of user data in the user data area; and updating the defect list so as to manage a defective area when it is determined that the defective area is present in the user data area.

In one embodiment of this invention, the multi-layered information recording medium may further comprise an additional defect list storing area capable of being used in place of the defect list storing area when the defect list storing area is unusable. The method may further comprise recording a defect list having the same contents as the contents of a defect list stored in the defect list storing area to the additional defect list storing area, when the defect list storing area is unusable.

In one embodiment of this invention, the multi-layered information recording medium may further comprise: a defect list location information storing area for storing defect list location information indicating the location of a defect list. The defect list location information storing area may be provided in one of the plurality of recording layers which is predetermined as a reference layer. The method may further comprise updating the defect list location information so that the defect list location information indicates the additional defect list storing area, when the additional defect list storing area is used in place of the defect list storing area.

In one embodiment of this invention, the multi-layered information recording medium may further comprise: a defect management area provided in one of the plurality of recording layers; and a spare defect list storing area provided in another one of the plurality of recording layer. The defect management area may comprise a plurality of defect list storing areas. The spare defect list storing area may comprise a plurality of additional defect list storing areas. The defect list storing area may be one of the plurality of defect list storing areas. The additional defect list storing area is one of the plurality of additional defect list storing area. When none of the plurality of defect list storing areas is usable, the additional defect list storing area may be used in place of the defect list storing area.

In one embodiment of this invention, the defect list storing area may be provided in one of the plurality of recording layers, and the additional defect list storing area may be provided in the same recording layer as that in which the defect list storing area is provided.

In one embodiment of this invention, the defect list storing area may be provided in one of the plurality of recording layers, and the additional defect list storing area may be provided in another one of the plurality of recording layers.

In one embodiment of this invention, the multi-layered information recording medium may further comprise: a spare area for containing at least one replacement area, wherein when at least one defective area is detected in the user data area, the at least one replacement area may be used in place of the at least one defective area. The method may further comprise replacing the defective area present in the user data area with the replacement area contained in the spare area.

Thus, the invention described herein makes possible the advantages of providing a defect management method capable of shortening the time required to read a defect management area in an initial process for a disc and efficiently managing defective areas.

These and other advantages of the present invention will become apparent to those skilled in the art upon reading and understanding the following detailed description with reference to the accompanying figures.

BRIEF DESCRIPTION OF THE DRAWINGS

FIG. 9 is a diagram showing the relationship between a first spare DL storing area and a DDS area in Embodiment 1 of the present invention.

FIG. 10B is a diagram showing locations of a first defect management area and a first spare DL storing area in Embodiment 1 of the present invention.

DESCRIPTION OF THE PREFERRED EMBODIMENTS (Embodiment 1)

Hereinafter, a multi-layered information recording medium according to Embodiment 1 of the present invention will be described with reference to the accompanying drawings. A multi-layered information recording medium as used herein refers to an information recording medium comprising at least two recording layers.

Figure 6:
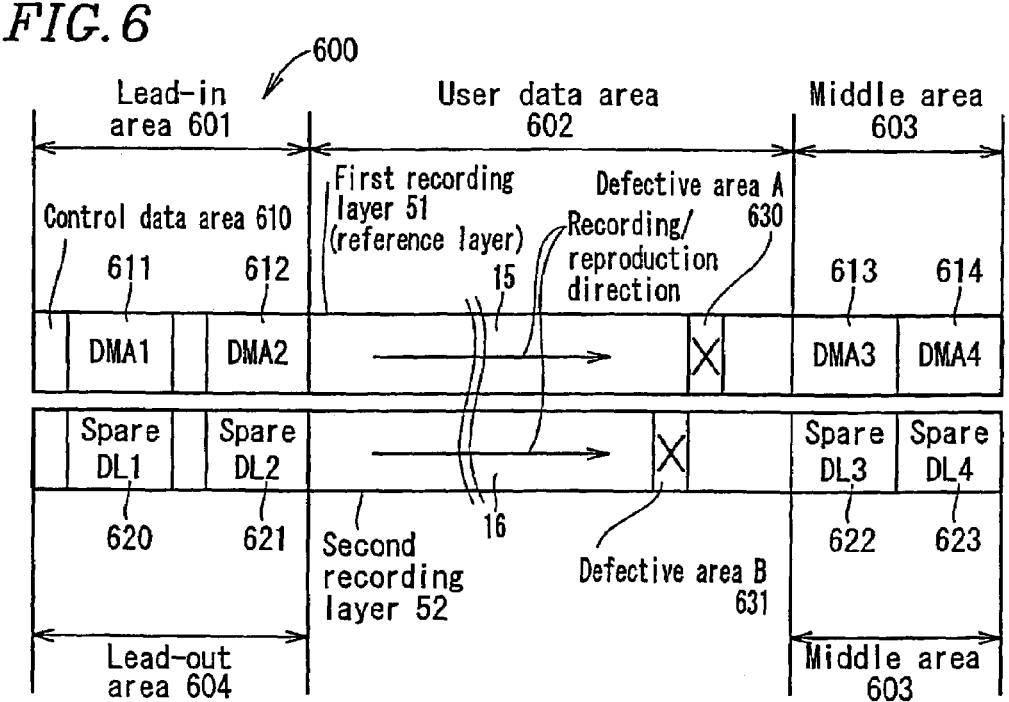
FIG. 6 is a diagram showing locations of areas in a multi-layered information recording medium according to Embodiment 1 of the present invention.

FIG. 6 is a diagram showing a multi-layered information recording medium 600 according to Embodiment 1 of the present invention. The multi-layered information recording medium 600 comprises two recording layers 51 and 52. The multi-layered information recording medium 600 contains a user data area 602 for recording user data. The user data area 602 straddles a boundary between the two recording layers 51 and 52. In Embodiment 1 of the present invention, the upper recording layer (51) shown in FIG. 6 is referred to as a first recording layer, and the lower recording layer (52) is referred to as a second recording layer.

The first recording layer 51 is located at a predetermined distance from a surface of the multi-layered information recording medium 600 through which data is read out (data read-out surface). The first recording layer 51 is referred to as a reference layer. This predetermined distance is equal to a distance from the data read-out surface of an optical disc comprising only one recording layer to the recording layer. A reference layer is predetermined among a plurality of recording layers.

The first recording layer 51 contains, from the inner periphery to the outer periphery along the recording/reproduction direction of the multi-layered information recording medium 600, a lead-in area 601, a first user data area 15 which is a portion of the user data area 602, and a middle area 603. The second recording layer 52 contains, from the outer periphery to the inner periphery along the recording/reproduction direction of the multi-layered information recording medium 600, a middle area 603, a second user data area 16 which is a portion of the user data area 602, and a lead-out area 604.

The lead-in area 601 provided in the first recording layer 51 (reference layer) contains a control data area 610 for storing control information for the multi-layered information recording medium 600, and a first defect management area 611 (DMA1) and a second defect management area 612 (DMA2) for recording defect management information relating to a defective area (defect management information contains disc definition structure data, a defect list, and the like). The middle area 603 of the first recording layer 51 contains a third defect management area 613 (DMA3) and a fourth defect management area 614 (DMA4). The first defect management area 611, the second defect management area 612, the third defect management area 613, and the fourth defect management area 614 each store the same defect management information. This is because by duplicately recording the same defect management information in a plurality of areas on the inner periphery and outer periphery of the multi-layered information recording medium 600, the reliability of the defect management information is improved. A defective area is herein a defective sector.

The middle area 603 of the second recording layer 52 contains a third spare defect list (DL) area 622 (spare DL3) and a fourth spare DL storing area 623 (spare DL4) for storing spare a defect list. The third spare DL storing area 622 (spare DL3) may be used in place of the third defect management area 613 (DMA3) of the first recording layer 51 when DMA3 is no longer appropriately recordable (unusable) due to degradation or the like. The fourth spare DL storing area 623 (spare DL4) maybe used in place of the fourth defect management area 613 (DMA4) of the first recording layer 51 when DMA4 is no longer appropriately recordable (unusable) due to degradation or the like. The lead-out area 604 contains a first spare DL storing area 620 (spare DL1) and a second spare DL storing area 621 (spare DL2) for storing a spare defect list. The first spare DL storing area 620 (spare DL1) may be used in place of the first defect management area 611 (DMA1) of the first recording layer 51 when DMA1 is no longer appropriately recordable (unusable) due to degradation or the like. The second spare DL storing area 621 (spare DL2) may be used in place of the second defect management area 612 (DMA2) of the first recording layer 51 when DMA2 is no longer appropriately recordable (unusable) due to degradation or the like.

Figure 1:
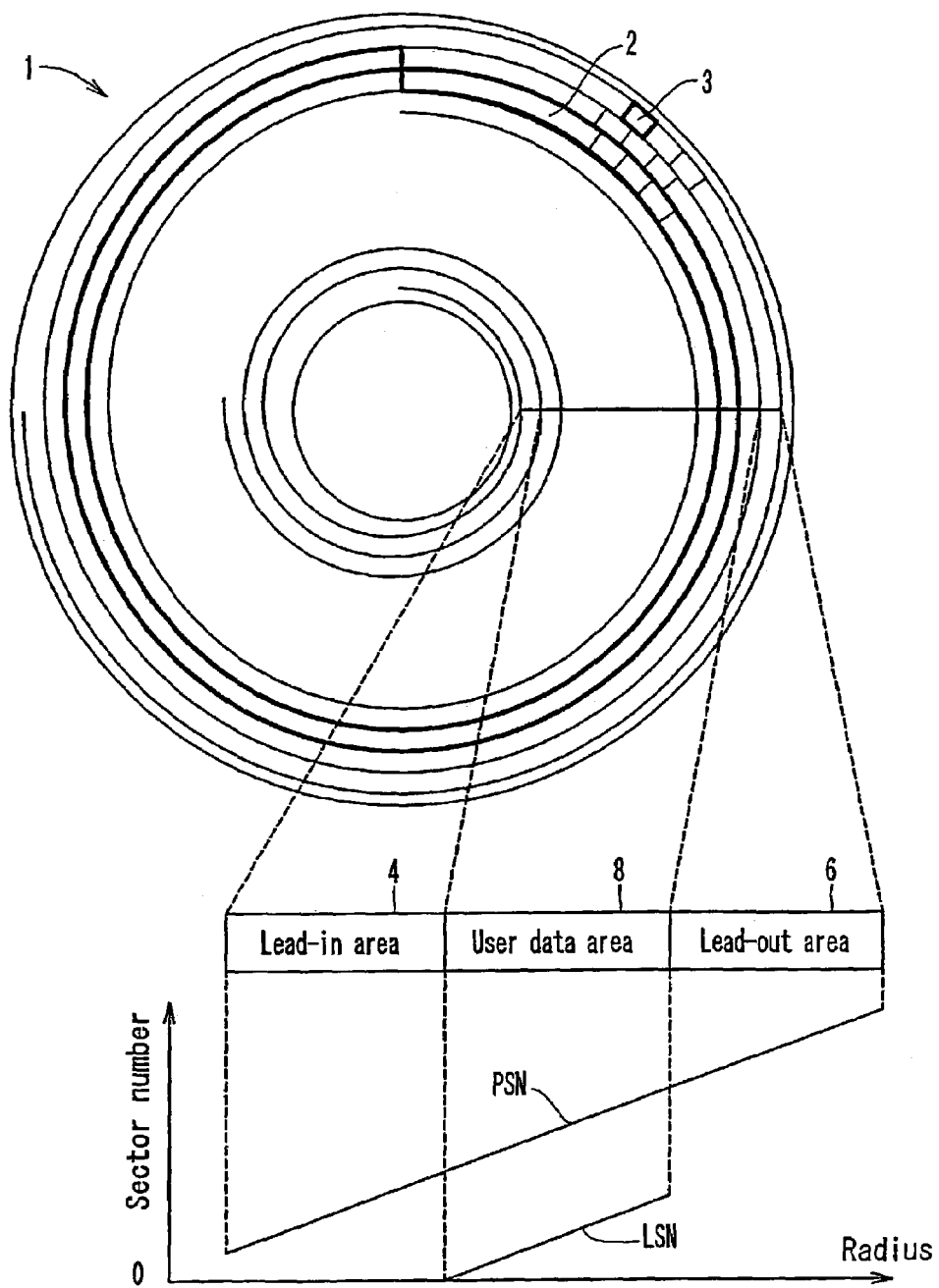
FIG. 1 is a diagram showing a track and sectors in an optical disc.
Figure 2:
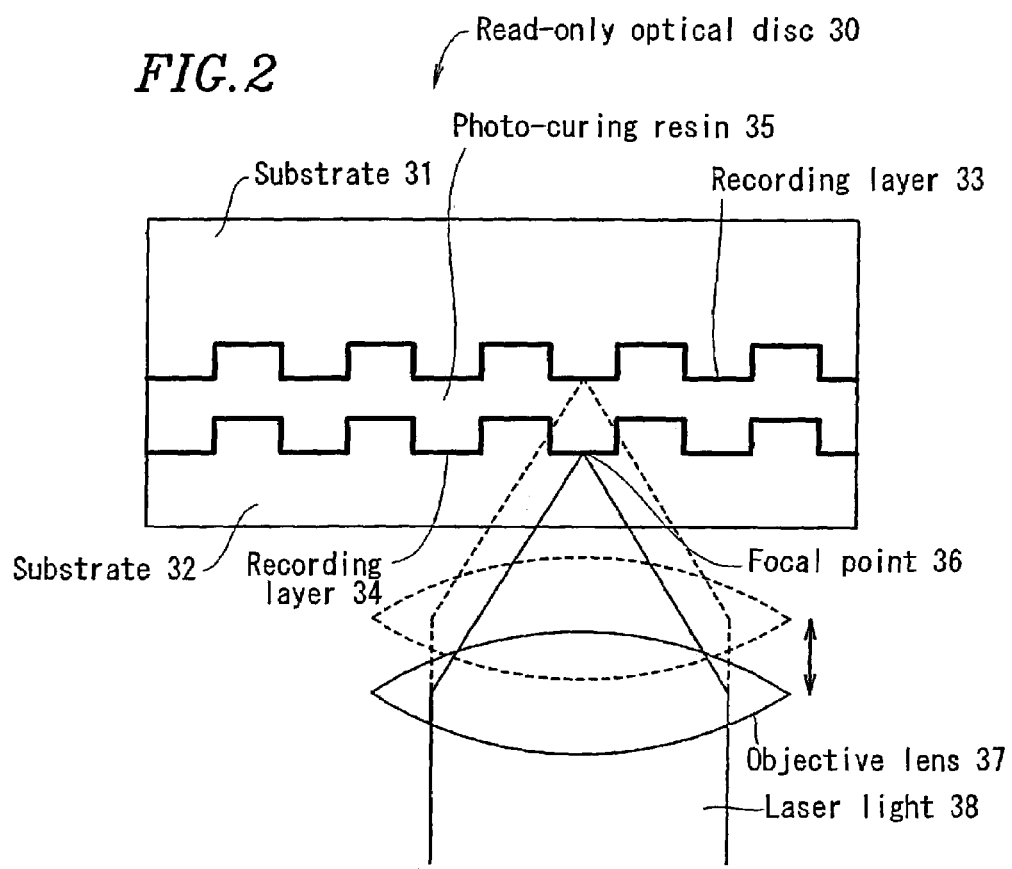
FIG. 2 is a diagram showing a principle of reproduction of an optical disc comprising two recording layers.
Figure 3A:
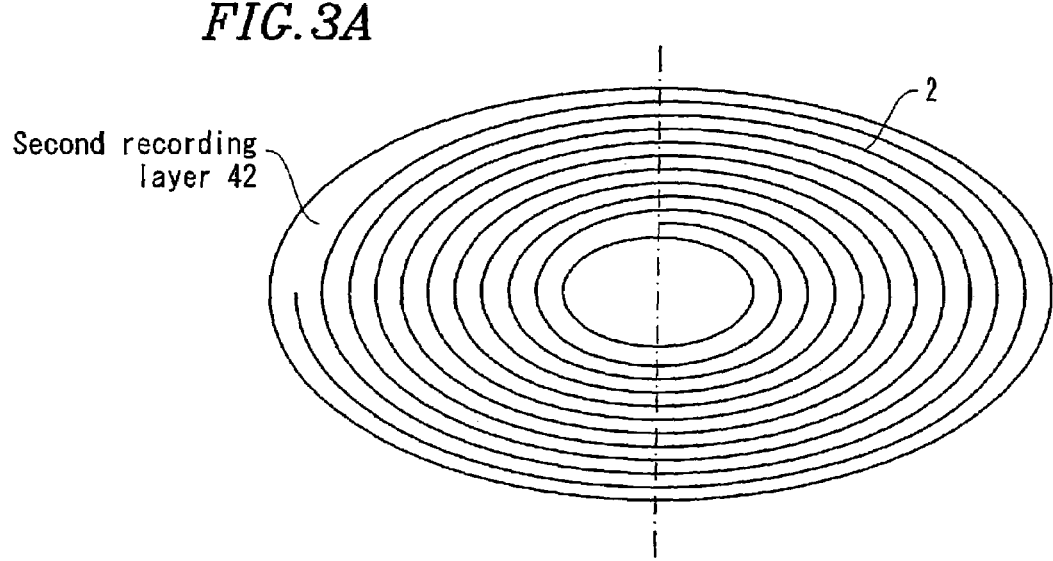
FIG. 3A is a diagram showing a groove pattern of a second recording layer in a parallel path DVD.
Figure 3B:
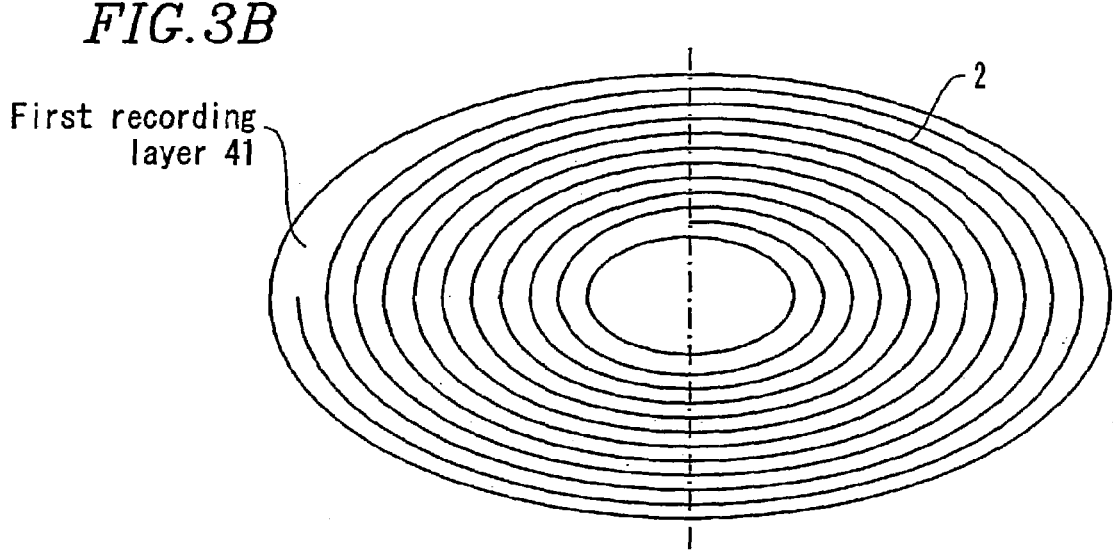
FIG. 3B is a diagram showing a groove pattern of a first recording layer in a parallel path DVD.
Figure 3C:
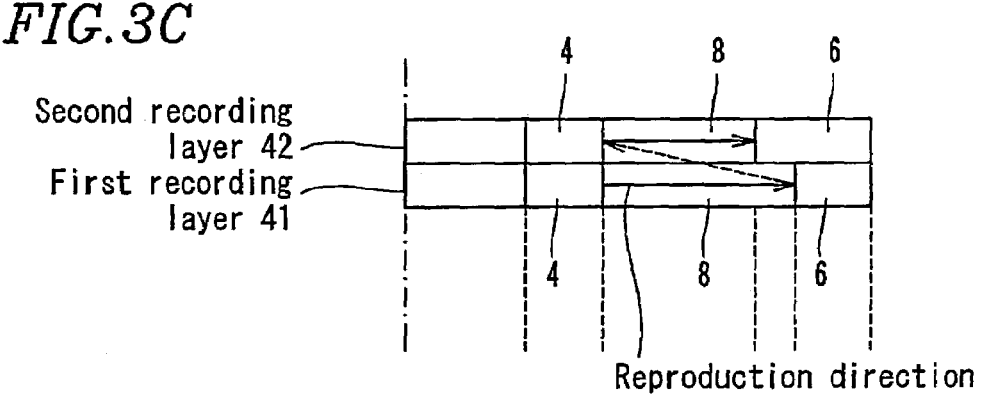
FIG. 3C is a diagram showing a reproduction direction of a parallel path DVD.
Figure 3D:
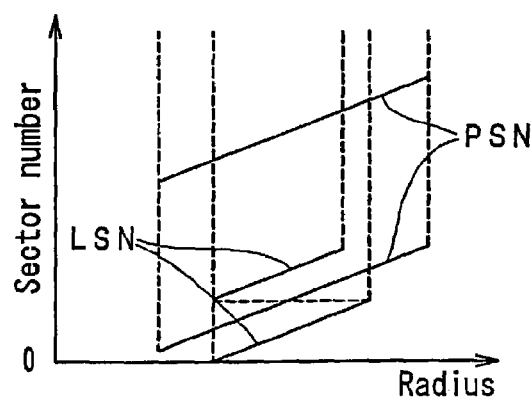
FIG. 3D is a diagram showing assignment of sector numbers in a parallel path DVD.
Figure 4A:
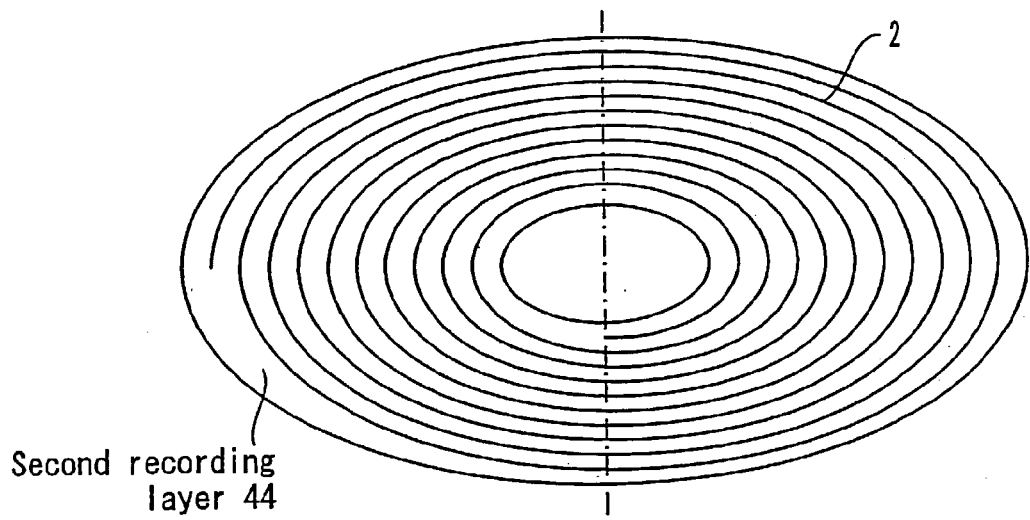
FIG. 4A is a diagram showing a groove pattern of a second recording layer in an opposite path DVD.
Figure 4B:
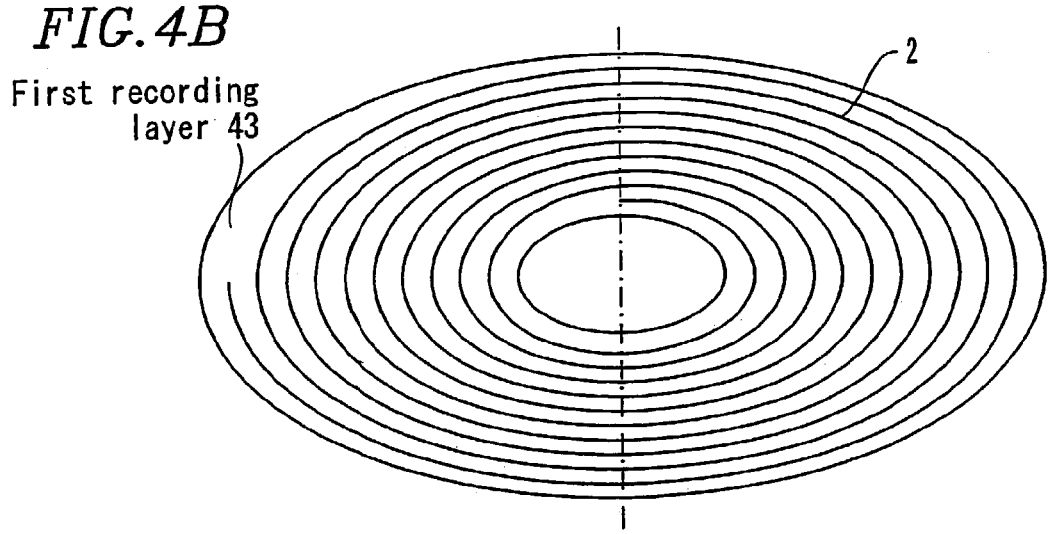
FIG. 4B is a diagram showing a groove pattern of a first recording layer in an opposite path DVD.
Figure 4C:
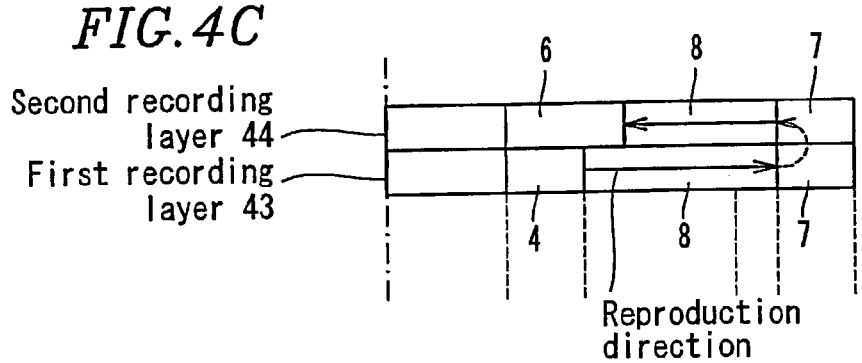
FIG. 4C is a diagram showing a reproduction direction of an opposite path DVD.
Figure 4D:
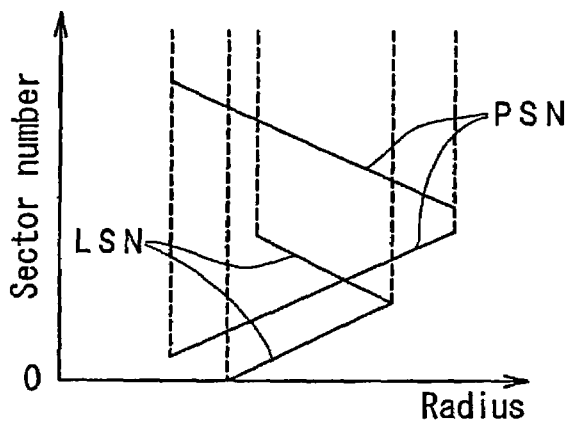
FIG. 4D is a diagram showing assignment of sector numbers in an opposite path DVD.
Figure 5A:
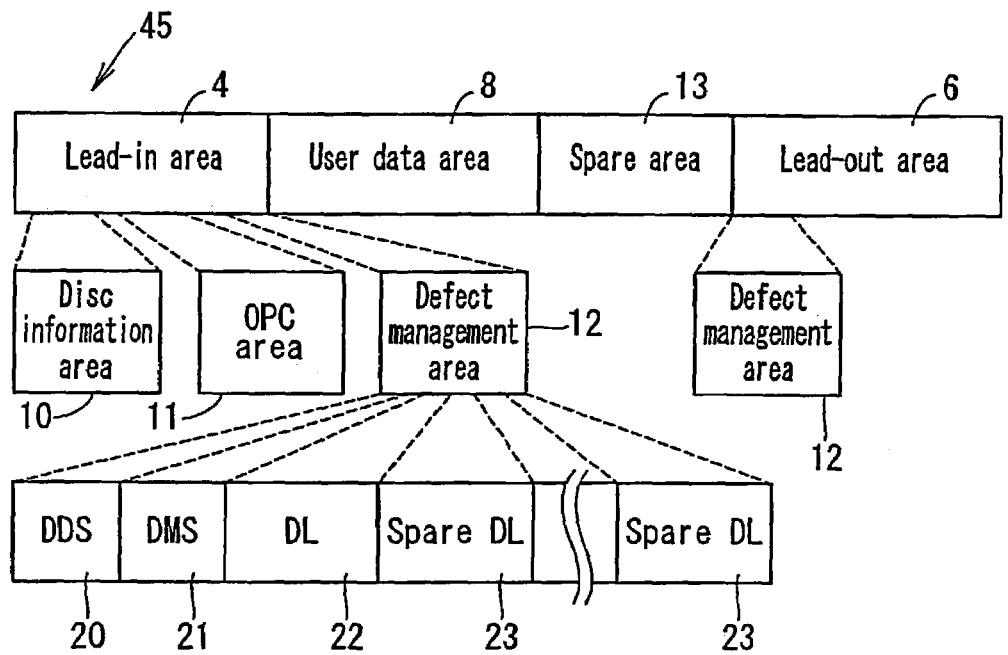
FIG. 5A is a diagram showing locations of areas in a DVD-RAM.
Figure 5B:
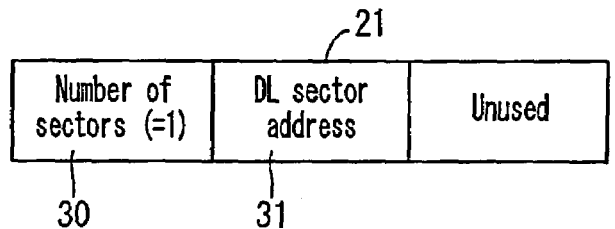
FIG. 5B is a diagram showing a data structure of a DMS shown in FIG. 5A.
Figure 5C:
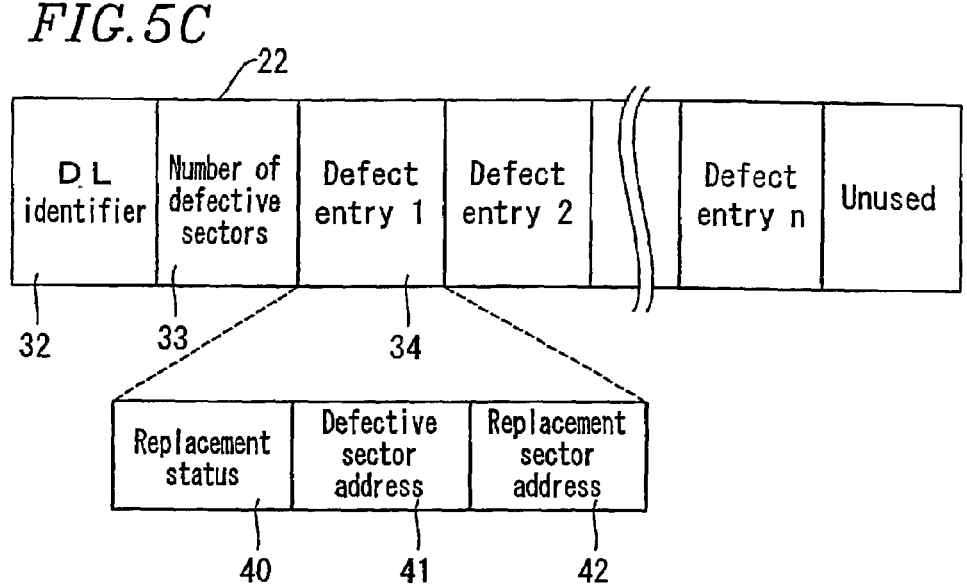
FIG. 5C is a diagram showing a data structure of a DL shown in FIG. 5A.

It is now assumed that as shown in FIG. 6, a defective area A 630 is present in the first user data area 15, and a defective area B 631 is present in the second user data area 16. Although the optical disc comprising the spare area 13 is described in the DESCRIPTION OF THE RELATED ART Section (FIG. 5A), the multi-layered information recording medium 600 of Embodiment 1 does not contain such a spare area. Therefore, none of the defective area A 630 and the defective area B 631 is replaced with a spare area.

Figure 7:
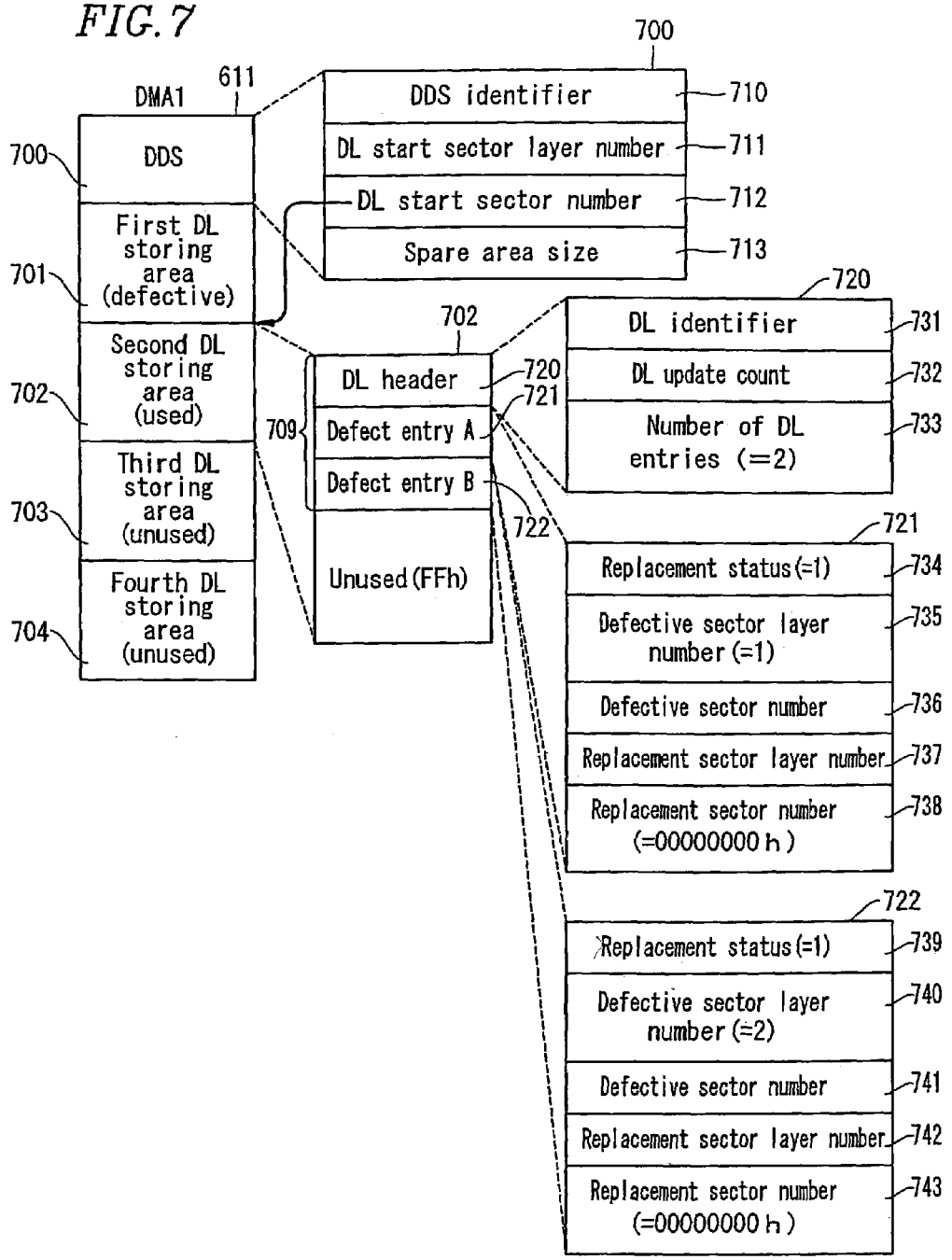
FIG. 7 is a diagram showing a data structure of a first defect management area in Embodiment 1 of the present invention.

Referring to FIG. 7, a data structure of the first defect management area 611 (DMA1) will be described below. Note that the first defect management area 611 (DMA1), the second defect management area 612 (DMA2), the third defect management area 613 (DMA3), and the fourth defect management area 614 (DMA4) each store the same defect management information. Here, the first defect management area 611 (DMA1) will be described.

The first defect management area 611 (DMA1) of the first recording layer 51 (reference layer) contains a disc definition structure (DDS) area 700 (DDS) and a plurality of defect list (DL) storing areas. In Embodiment 1, the first defect management area 611 (DMA1) contains a first DL storing area 701, a second DL storing area 702, a third DL storing area 703, and a fourth DL storing area 704. Not all of these DL storing areas are simultaneously used. Any one of the DL storing areas is used. In the example shown in FIG. 7, the first DL storing area 701 is a defective area, and the second DL storing area 702 is used. The third DL storing area 703 and the fourth DL storing area 704 are unused. The second DL storing area 702 stores a defect list (DL) 709. When at least one defective area is detected in the use data area 602, the defect list 709 is used to manage the detected defective area. The defect list 709 contains the defective area(s) detected in the user data area 602 and the location information of their replacement area(s). The DDS area 700 functions as a defect list location information storing area for storing defect list location information indicating the location of a DL storing area storing the defect list 709 (e.g., the second DL storing area 702 in FIG. 7). The DDS area 700 also stores information indicating a defect verification status or the like. If the second DL storing area 702 becomes defective due to repetition of write operations or the like, the third DL storing area 703 is used.

The DDS area 700 contains a DDS identifier 710 for identifying a DDS, a DL start sector layer number 711 indicating a recording layer containing a DL storing area currently used among a plurality of recording layers (a layer number may be any information which permits to distinguish a plurality of recording layers from each other), a DL start sector number 712 indicating the location of a DL storing area currently used in a recording layer using a sector number which is uniquely identifiable in the recording layer, and a spare area size area 713 for storing information relating to the size of a spare area. The DL start sector layer number 711 and the DL start sector number area 712 contain defect list location information. Since the multi-layered information recording medium 600 does not contain a spare area, a value 0 is set in the spare area size area 713. The spare area size area 713 can contain the number of recording layers, or a plurality of sizes depending on the location of a spare area. For the sake of simplicity, it is here assumed that when the multi-layered information recording medium 600 is provided with spare areas, a spare area having a size specified by the spare area size area 713 is provided in both the inner periphery and the outer periphery of each recording layer.

The defect list 709 contains a DL header 720 and two pieces of defect entry data. The DL header area 720 contains a DL identifier 731 for identifying a defect list, a DL update count 732 for indicating the number of repetitions of rewriting the defect list, and a number of DL entries 733 for indicating the number of defect entries stored in areas following the DL header 720. In the example shown in FIG. 7, two pieces of defect entry data, i.e., a defect entry A 721 and a defect entry B 722, are registered, and therefore, the number of DL entries 733 indicates two.

The defect entry A 721 contains a replacement status flag 734, a defective sector layer number 735, a defective sector number 736, a replacement sector layer number 737, and a replacement sector number 738. Similarly, the defect entry B 722 contains a replacement status flag 739, a defective sector layer number 740, a defective sector number 741, a replacement sector layer number 742, and a replacement sector number 743. The data contained in the defect entry A 721 will be described. The replacement status flag 734 is a flag indicating whether or not a defective area is replaced with a spare area (normal area) and indicates a value 1 when no replacement is performed. In Embodiment 1, no spare area is allocated in the multi-layered information recording medium 600, and therefore, a value 1 indicating no replacement is set in the replacement status flag 734.

The defective sector layer number 735 indicates the layer number of a recording layer in which a defective area is detected. The replacement sector layer number 737 indicates the layer number of a recording layer in which a replacement area is provided. These layer numbers are any information which permits to distinguish a plurality of recording layers from each other. The defect entry A 721 is used to manage the defective area A 630 (FIG. 6). The defect entry B 722 is used to manage the defective area B 631 (FIG. 6). In this case, for example, a value 1 indicating the first recording layer 51 is set in the defective sector layer number 735, while a value 2 indicating the second recording layer 52 is set in the defective sector layer number 740. The defective sector number 736 indicates an identification value from which the location of a defective area is uniquely determined in the recording layer in which the defective area is detected. The sector number is a value which increments by ones from the inner periphery toward the outer periphery of the multi-layered information recording medium 600, for example.

Even if the sector number of any sector in the first recording layer 51 is the two's complement of the sector number of a corresponding sector in the second recording layer 52 where the sectors are placed at the same radial position, the above-described conditions are satisfied as in the opposite paths of a DVD-ROM. For example, consider that physical sector numbers (PSNs) are represented in the 28-bit format, and the PSNs of the first recording layer 51 are within the range of 0000000h to 0FFFFFFh ("h" means that the value is represented by a hexadecimal number). When the PSN of a certain sector in the first recording layer 51 is 0123450h, the PSN of a corresponding sector in the second recording layer 52 at the same radial position is FEDCBAFh. In this case, the most significant bit of the PSN for the first layer is constantly 0 and the most significant bit of the PSN for the second layer is constantly F. Thus, the most significant bit can be used to indicate the layer number.

Similarly, a value capable of uniquely identifying the location of an area replacing a defective area is set in each of the replacement sector layer number 737 and the replacement sector number 738. Note that in Embodiment 1, since there is no spare area, no replacement is performed. Therefore, 0 is set in each of the replacement sector layer numbers 737 and 742, while 00000000h is set in each of the replacement sector numbers 738 and 743.

If a defect management area (DMA) was separately provided in each of the first recording layer 51 and the second recording layer 52, it is necessary for the recording/reproduction apparatus to read out defect management information from each recording layer as described above. However, as described above, the multi-layered information recording medium 600 according to Embodiment 1 of the present invention can obtain defect management information for all of the recording layers only by reading the defect management information from the reference layer. Therefore, it is possible to perform an initial process for the multi-layered information recording medium 600 simply and in a short time.

In the multi-layered information recording medium 600, the defective areas of all of the recording layers are managed in a unified manner. Therefore, DL storing areas can be used more efficiently than when defective areas are managed for each recording layer. For example, an optical disc is assumed to comprise two recording layers containing a maximum total of 1000 sectors for which occurrence of a defective area is managed. In this case, when defect management information is separately stored in each recording layer, it is necessary to provide each layer with a DL storing area which can contain defect entries of a maximum of 1000 sectors. This is because it is necessary to handle an unbalanced situation such that 950 defective sectors are present in the first recording layer 51 while no defective area is present in the second recording layer 52. On the other hand, in the case of the multi-layered information recording medium 600 according to Embodiment 1 of the present invention, defective areas in all of the recording layers are managed in an unified manner using a DL storing area which can contain defect entries of a maximum of 1000 sectors, and therefore, the total size of all DL storing areas can be reduced.

Figure 8:
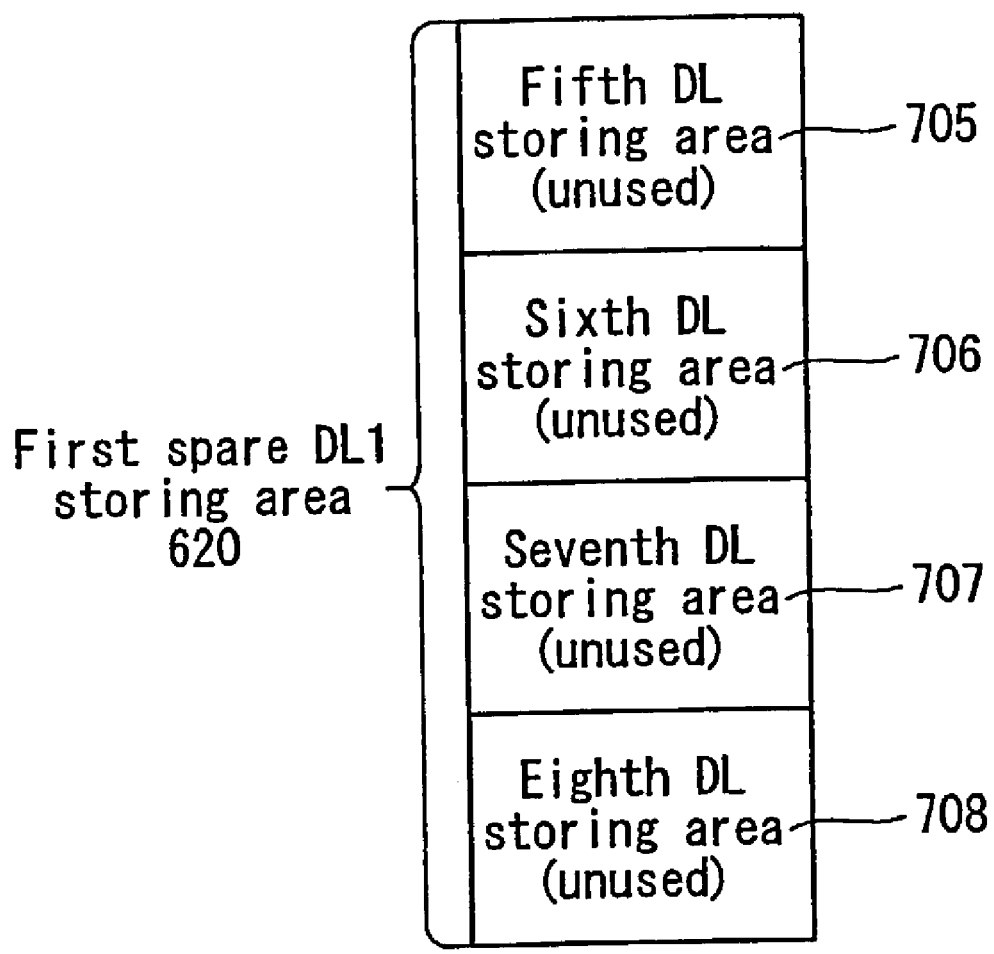
FIG. 8 is a diagram showing a data structure of a first spare DL storing area in Embodiment 1 of the present invention.

Next, the first spare DL storing area 620 (spare DL1) included in the second recording layer 52 will be described with reference to FIG. 8. The first spare DL storing area 620 (spare DL1) contains a plurality of DL storing areas. In the multi-layered information recording medium 600 according to Embodiment 1 of the present invention, the first spare DL storing area 620 (spare DL1) contains four DL storing areas, i.e., a fifth DL storing area 705, a sixth DL storing area 706, a seventh DL storing area 707, and an eighth DL storing area 708, each of which is unused. A DL storing area contained in the first spare DL storing area 620 (spare DL1) is used in place of the DL storing areas contained in the first defect management area 611 (DMA1) when all of them are determined to be defective and unusable. A defect list having the same contents as those of a defect list stored in a DL storing area contained in the first defect management area 611 (DMA1) is stored in a DL storing area contained in the first spare DL storing area 620 (spare DL1).

As does the first spare DL storing area 620 (spare DL1), the second spare DL storing area 621 (spare DL2), the third spare DL storing area 622 (spare DL3), and the fourth spare DL storing area 623 (spare DL4) each contain a plurality of DL storing areas. A DL storing area contained in the second spare DL storing area 621 (spare DL2) is used in place of the DL storing areas contained in the second defect management area 612 (DMA2) when all of them are determined to be defective and unusable. A DL storing area contained in the third spare DL storing area 622 (spare DL3) is used in place of the DL storing areas contained in the third defect management area 613 (DMA3) when all of them are determined to be defective and unusable. A DL storing area contained in the fourth spare DL storing area 623 (spare DL4) is used in place of the DL storing areas contained in the fourth defect management area 614 (DMA4) when all of them are determined to be defective and unusable.

In the above-described case, when the first defect management area 611 (DMA1) is unusable, the first spare DL storing area 620 (spare DL1) is used. Alternatively, for example, another spare DL storing area, such as the second spare DL storing area 621 or the like, may be used.

FIG. 9 shows an example of use of the first spare DL storing area 620 (spare DL1) in the second recording layer 52. In the example of FIG. 9, four DL storing areas in the first defect management area 611 (DMA1) are determined to be defective. In this case, a defect list is recorded in a DL storing area of the first spare DL storing area 620 (spare DL1) contained in the second recording layer 52. As shown in FIG. 9, when the fifth DL storing area 705 is also defective, the defect list 709 (FIG. 7) is recorded in the sixth DL storing area 706. In this case, a value 2 which indicates the use of a DL storing area contained in the second recording layer 52, is set in the DL start sector layer number 711 of the DDS area 700. The sector number of the starting position of the sixth DL storing area 706 is stored in the DL start sector number 712.

As described above, in the multi-layered information recording medium 600 according to Embodiment 1 of the present invention, the recording layer other than the reference layer contains a spare DL storing area. Therefore, even if a DL storing area in the reference layer becomes unusable, the spare DL storing area can be used to keep the reliability of defect management information. Particularly, this technique is useful for improvement of reliability of recording media which are likely to be degraded due to repetition of write operations. Note that in Embodiment 1 the fifth DL storing area 705, the sixth DL storing area 706, the seventh DL storing area 707, and the eighth DL storing area 708 are used in this order, however, these areas may be used in descending order from the eighth DL storing area 708 when data is recorded in the second recording layer 52 from the outer periphery to the inner periphery of the multi-layered information recording medium 600.

Figure 10A:
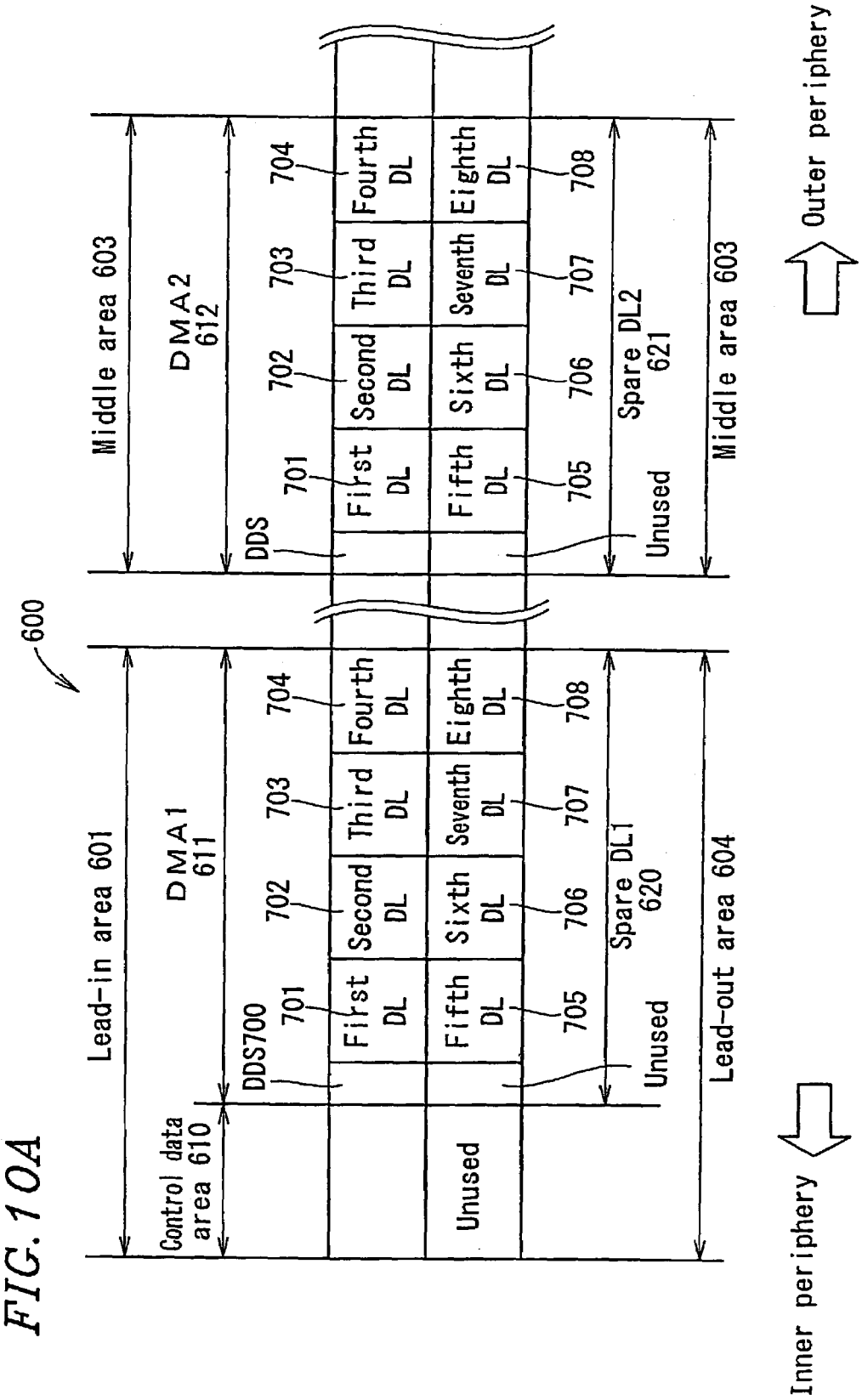
FIG. 10A is a diagram showing locations of a first defect management area and a first spare DL storing area in Embodiment 1 of the present invention.

Next, with reference to FIGS. 10A and 10B, a description will be given of the relationship between the radial position of a defect management area in the first recording layer 51 (reference layer) and the radial position of a spare DL storing area in the second recording layer 52. FIG. 10A is an enlarged diagram showing locations of the lead-in area 601, the middle area 603, and the lead-out area 604 in the multi-layered information recording medium 600 according to Embodiment 1 of the present invention. It is now assumed that the first spare DL storing area 620 (spare DL1) is used. In this case, a defect list is stored in the first spare DL storing area 620, (spare DL1), which is indicated by the DL start sector number 712 of the DDS area 700. The first spare DL storing area 620 (spare DL1) and the first defect management area 611 (DMA1) are desirably located at substantially the same radial positions. If so, a recording/reproduction head needs to be shifted by only a small distance in a radial direction. Thus, as shown in FIG. 10A, the first DL storing area 701 in the first defect management area 611 (DMA1) and the fifth DL storing area 705 in the first spare DL storing area 620 (spare DL1) are desirably located at substantially the same radial positions. This is because when the contents of the first defect management area 611 (DMA1) are read out in an initial process for the multi-layered information recording medium 600 and it is determined according to the DDS area 700 that a defect list is stored in the fifth DL storing area 705 of the first spare DL storing area 620 (spare DL1), having substantially the same radial position makes it possible to access the area quickly. However, an error or the like may occur when the first recording layer 51 and the second recording layer 52 are attached together in a fabrication step, thereby making it difficult to arrange the first spare DL storing area 620 (spare DL1) and the first defect management area 611 (DMA1) at the same radial position. As a result, as shown in FIG. 10B, the first recording layer 51 is slightly shifted from the second recording layer 52. In FIG. 10B, the first defect management area 611 (DMA1) in the first recording layer 51 is radially shifted from the first spare DL storing area 620 (spare DL1) in the second recording layer 52. The magnitude of the shift is called an attachment error in a disc fabrication process.

Considering the operation of a recording/reproduction apparatus for recording and reproduction of the multi-layered information recording medium 600, an error occurs due to the inaccuracy of control of lens positions, the eccentricity of a disc, or the like when a focal point is switched between the first recording layer 51 and the second recording layer 52. Therefore, an error in radial position between the first recording layer 51 and the second recording layer 52 may be tolerable within a predetermined range based on the attachment precision of recording layers in a disc fabrication process as shown in FIG. 10B.

Figure 10C:
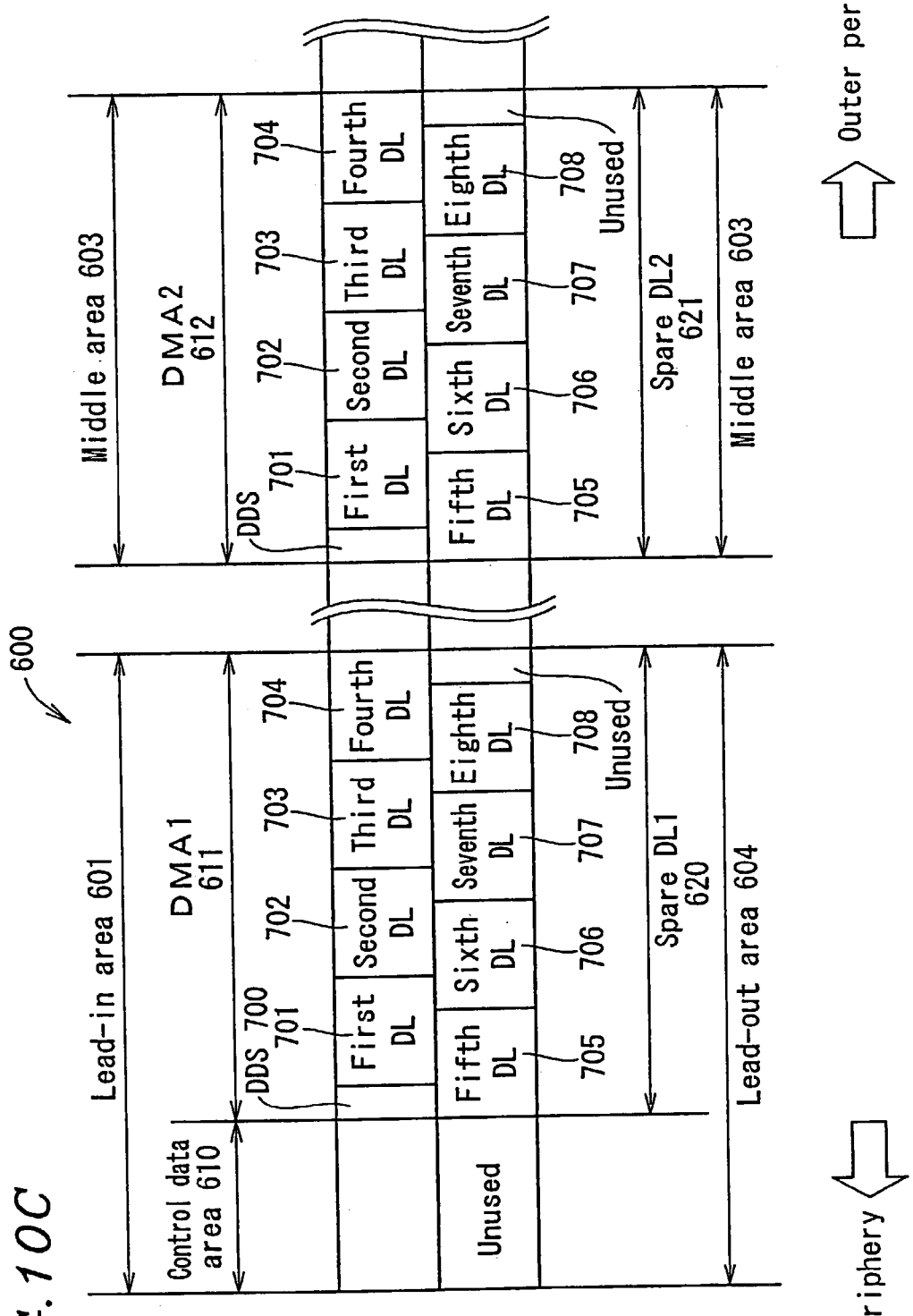
FIG. 10C is a diagram showing locations of a first defect management area and a first spare DL storing area in Embodiment 1 of the present invention.

Further, for the positional relationship between a defect management area and a spare DL storing area, a smaller distance between a DDS area in a defect management area and a DL storing area in a corresponding spare DL storing area is preferable in view of an access time. For example, as shown in FIG. 10C compared to FIG. 10A, each DL storing area in a spare DL storing area may be shifted toward the inner periphery by a used area in a spare DL storing area.

As described above, when defect management areas (DMAm [m=1, 2, 3, 4]) in a reference layer and spare DL storing area (spare DLm) in a recording layer(s) other than the reference layer are located at substantially the same radial positions, it is possible to access a defect list in a short time even if the defect list is stored in a spare DL storing area (spare DLm).

The multi-layered information recording medium 600 according to Embodiment 1 of the present invention has been heretofore described.

As described above, in the multi-layered information recording medium 600 according to Embodiment1 of the present invention comprising a plurality of recording layers, defect management information relating to all of the recording layers is stored in a single recording layer. Therefore, it is possible to read out the defect management information more simply and rapidly.

In the multi-layered information recording medium 600 according to Embodiment 1 of the present invention, all defect management information relating to a plurality of recording layers is stored in a reference layer. Therefore, even if a larger number of defective areas are intensively present in one recording layer, it is possible to use a defect entry area efficiently.

In the multi-layered information recording medium 600 according to Embodiment 1 of the present invention, a spare DL storing area is provided in a recording layer other than a reference layer. Therefore, it is possible to significantly improve the reliability of defect management information of defects due to degradation of medium material.

In the multi-layered information recording medium 600 according to Embodiment 1 of the present invention, a spare DL storing area is placed within a predetermined error range from the radial position of a defect management area in a reference layer. Therefore, it is possible to reduce an access time required to read a spare DL storing area after reading a DDS area.

Note that Embodiment 1 shows an opposite path disc in which recording and reproduction are performed from the inner periphery to the outer periphery of the first recording layer 51 and from the outer periphery to the inner periphery of the second recording layer 52, though a parallel path disc can be similarly managed in which recording and reproduction are performed from the inner periphery to the outer periphery in all recording layers. The arrangement of recording layers is not particularly limited as long as a defect management area and a spare DL storing area are located near each other. Therefore, the arrangement may be slightly adjusted depending on the difference in a recording and reproduction direction between an opposite path disc and a parallel path disc. For example, in an opposite path disc, a second recording layer is accessed from the outer periphery to the inner periphery. Therefore, a spare DL storing area in the second recording layer may be placed closer to the inner periphery than a defect management area provided on the inner periphery.

Note that in the case of a multi-layered information recording medium having at least three recording layers, the multi-layered information recording medium may store DL storing area management information in order to manage the statuses of DL storing areas in a defect management area and a spare DL storing area. An example of DL storing area management information is such that a value 0 is set when the DL storing area is unused, a value 1 is set when the DL storing area is used, and a value 2 is set when the DL storing area is determined to be defective. By storing such information for managing each DL storing area in a DDS area, the DL storing areas can be efficiently managed.

Note that in Embodiment 1 a reference layer is the upper recording layer of a plurality of recording layer in the figures, though the reference layer is not so limited and may be any of the recording layers uniquely determined under a predetermined rule. For example, a reference layer may be a recording layer of a plurality of recording layers which is located at the shortest distance from the data read-out surface of a multi-layered information recording medium, or a recording layer which is located at the longest distance from the data read-out surface.

Note that in Embodiment 1 the multi-layered information recording medium 600 comprising two recording layers is described, though an information recording medium may comprise a larger number (at least 3) of recording layers. In either multi-layered recording medium, a defect management area is provided in any one of recording layers while a spare DL storing area is provided in other recording layers.

(Embodiment 2)

Next, a multi-layered information recording medium according to Embodiment 2 of the present invention will be described with reference to the accompanying drawings.

Figure 11:
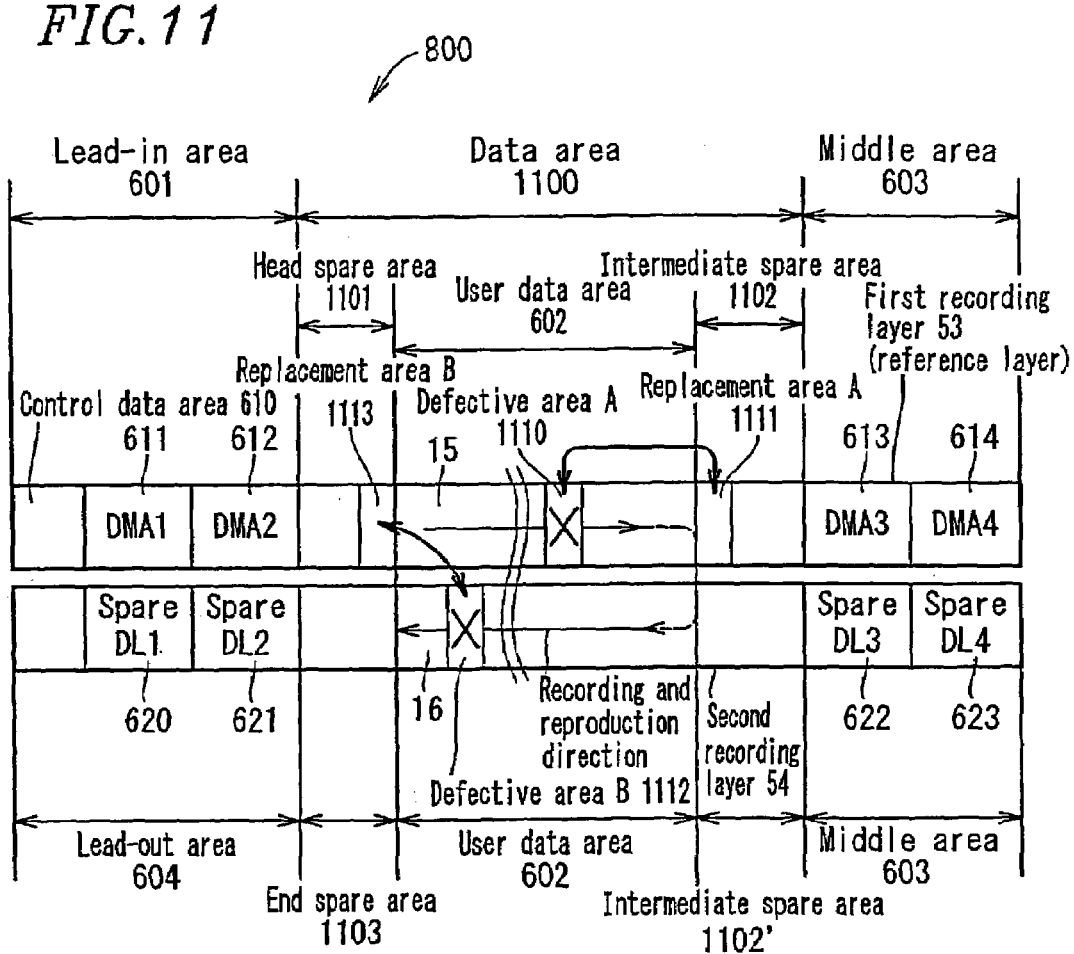
FIG. 11 is a diagram showing locations of areas in a multi-layered information recording medium according to Embodiment 2 of the present invention.

FIG. 11 is a diagram showing a multi-layered information recording medium 800 according to Embodiment 2 of the present invention. The multi-layered information recording medium 800 of Embodiment 2 comprises a first recording layer 53 and a second recording layer 54. In the first recording layer 53 and the second recording layer 54, defect management areas and spare DL storing areas are arranged in a manner similar to that in the first recording layer 51 and the second recording layer 52 shown in Embodiment 1. The multi-layered information recording medium 800 is different from the multi-layered information recording medium 600 of Embodiment 1 in that in the multi-layered information recording medium 800, the first recording layer 53 contains a head spare area 1101 and an intermediate spare area 1102, and the second recording layer 54 contains an intermediate spare area 1102' and an end space area 1103. The sizes of these spare areas can be separately determined, however, for the sake of simplicity, it is assumed that all spare areas have the same size (the size is indicated by the spare area size 713 (FIG. 12)). A data area 1100 is an area which contains a user data area 602 and the above-described spare areas. Hereinafter, features of the multi-layered information recording medium 800 different from the multi-layered information recording medium 600 will be described.

The head spare area 1101, the intermediate spare area 1102, the intermediate spare area 1102', and the end space area 1103 contain a replacement area. When a defective area is detected in the user data area 602, the replacement area may be used in place of the defective area. A defective area is herein a defective sector. A defective area A 1110 and a defective area B 1112 each are a defective area in which user data cannot be appropriately recorded and reproduced. The defective area A 1110 is replaced with a replacement area A 1111 containing the intermediate spare area 1102. As a result, user data which was to be recorded in the defective area A 1110 is recorded in the replacement area A 1111. Similarly, in a read operation, user data is read from the replacement area A 1111 but not from the defective area A 1110. Similarly, a defective area B 1112 in the second recording layer 54 is replaced with a replacement area B 1113 containing the head spare area 1101 in the first recording layer 53.

Figure 12:
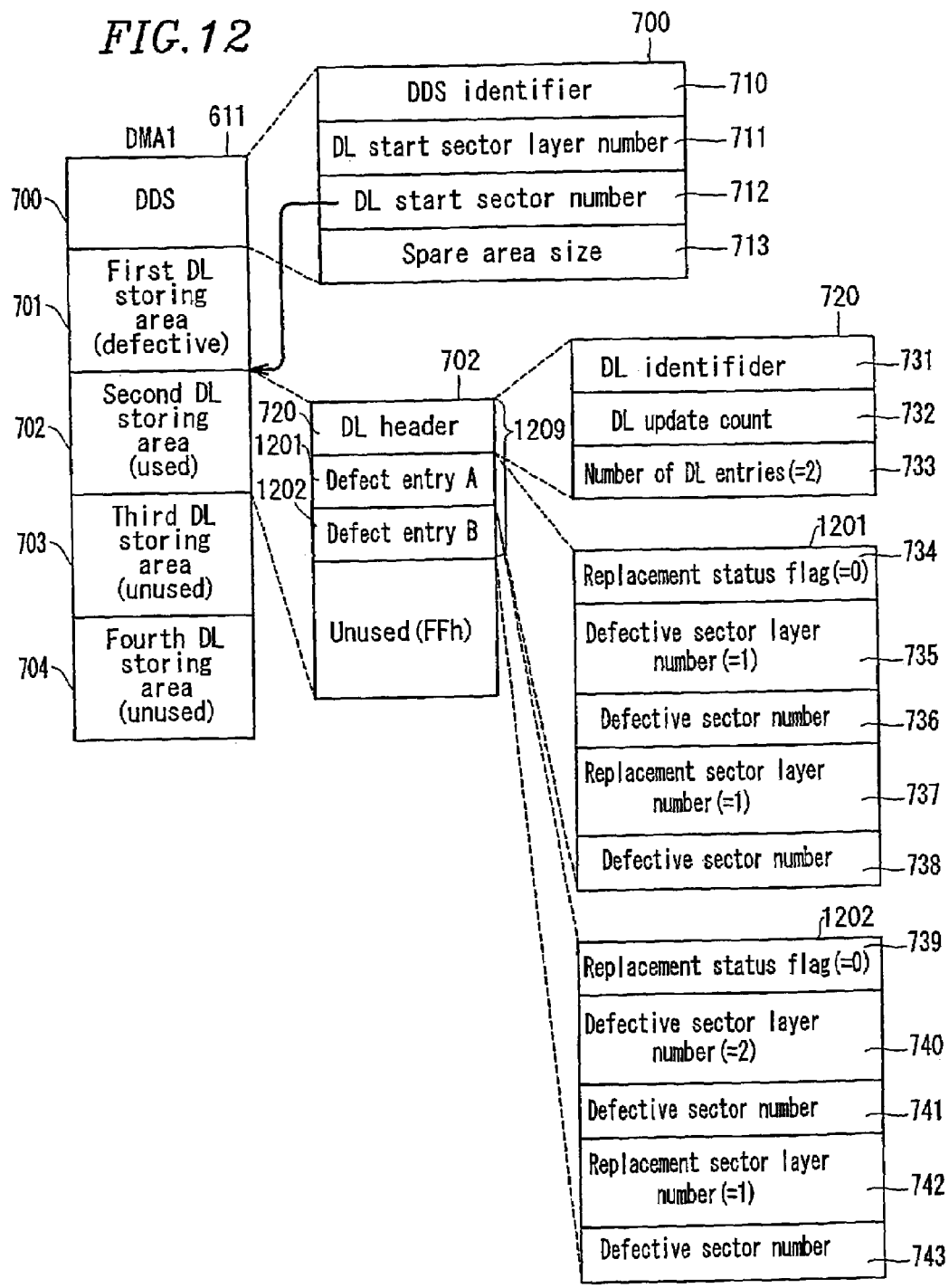
FIG. 12 is a diagram showing a data structure of a first defect management area in Embodiment 2 of the present invention.

Next, the contents of defect management information in Embodiment 2 will be described with reference to FIG. 12. FIG. 12 shows locations of areas in a first defect management area 611 (DMA1). Hereinafter, only features of the first defect management area 611 (DMA1) of Embodiment 2 different from Embodiment 1 will be described. A defect list 1209 stored in the second DL storing area 702 contains two defect entries, i.e., a defect entry A 1201 and a defect entry B 1202. The defect entry A 1201 is information indicating that the defective area A 1110 of FIG. 11 is replaced with the replacement area A 1111. On the other hand, the defect entry B 1202 stores information indicating that the defective area B 1112 of FIG. 11 is replaced with the replacement area B 1113. Therefore, a replacement status flag contained in the defect entry A 1201 and a replacement status flag contained in the defect entry B 1202 each are 0. This is because a replacement status flag has a value 0 when a corresponding defective area is replaced with a replacement area, and has a value 1 when the defective area is not replaced and is registered. A defective sector layer number and a defective sector number indicate a number which permits to identify a recording layer and a sector number which permits to uniquely determine the location of a sector in a recording layer, respectively, as in Embodiment 1. The defective area A 1110 and its replacement area B 1111 are both contained in the first recording layer 53, and therefore, a defective sector layer number 735 and a replacement sector layer number 737 contained in the defect entry A 1201 both indicate 1. On the other hand, the defective area B 1112 is contained in the second recording layer 54, and the. replacement area B 1113 is contained in the first recording layer 53. Therefore, a defective sector layer number 740 contained in the defect entry B 1202 indicates a value 2 representing the second recording layer 54, and a replacement sector layer number 742 indicates a value 1 representing the first recording layer 53. Note that the replacement sector numbers 737 and 742 represent a sector number which uniquely determines the starting position of a replacement area in a recording layer as do the defective sector numbers 735 and 740.

In Embodiment 2, the defective area B 1112 in the second recording layer 54 is replaced with the replacement area B 1113 in the first recording layer 53. It is now assumed that, for example, a total of 1000 defective sectors can be present in two recording layers. If defect management was performed separately for each recording layer, a spare area(s) corresponding to at least 1000 sectors has to be allocated in each recording layer. In other words, a spare area(s) corresponding to a total of at least 2000 sectors is required for two recording layers. On the other hand, in Embodiment 2, a defect list for all recording layers is stored in a unified manner while a defective area in a certain recording layer can be replaced with a spare area in another recording layer. Therefore, in the present invention, a spare area(s) corresponding to a total of 1000 sectors is required for the two recording layers (e.g., 500 sectors are provided in each of the two recording layers). Therefore, the volume of an area allocated as a spare area can be reduced, thereby making it possible to increase the volume of the user data area 602.

The multi-layered information recording medium 800 according to Embodiment 2 of the present invention has been heretofore described.

As described above, the multi-layered information recording medium 800 according to Embodiment 2 of the present invention will be described below in terms of its effects in addition to the effects of the present invention described in Embodiment 1.

Defect management information relating to all recording layers contained in a multi-layered information recording medium is managed by a single defect list, thereby making it possible to replace a defective area in a certain layer with a replacement area in a different layer. Therefore, even if defective areas occur intensively in a certain recording layer and all spare area in this layer are exhausted, spare areas in other recording layers can be used for replacement. Therefore, even if defective areas occur intensively in a specific recording layer due to degradation of a medium material or the like, spare areas in all recording layers can be efficiently used and the reliability of recorded data can be achieved. It is clearly appreciated that a method of using a spare DL in Embodiment 2 is the same as that in Embodiment 1, though a description thereof is omitted.

Note that the disc medium of Embodiment 2 is an opposite path disc in which recording and reproduction are performed from the inner periphery to the outer periphery of the first recording layer 53 and from the, outer periphery to the inner periphery of the second recording layer 54. Similarly, in a parallel path disc in which recording and reproduction are performed from the inner periphery to the outer periphery in all recording layers, defective areas can be similarly managed.

(Embodiment 3)

Hereinafter, an information recording/reproduction apparatus 500 according to Embodiment 3 of the present invention will be described with reference to the accompanying drawings. The information recording/reproduction apparatus 500 performs recording and reproduction using the multi-layered information recording mediums 600 and 800 described in Embodiments 1 and 2, respectively.

Figure 13:
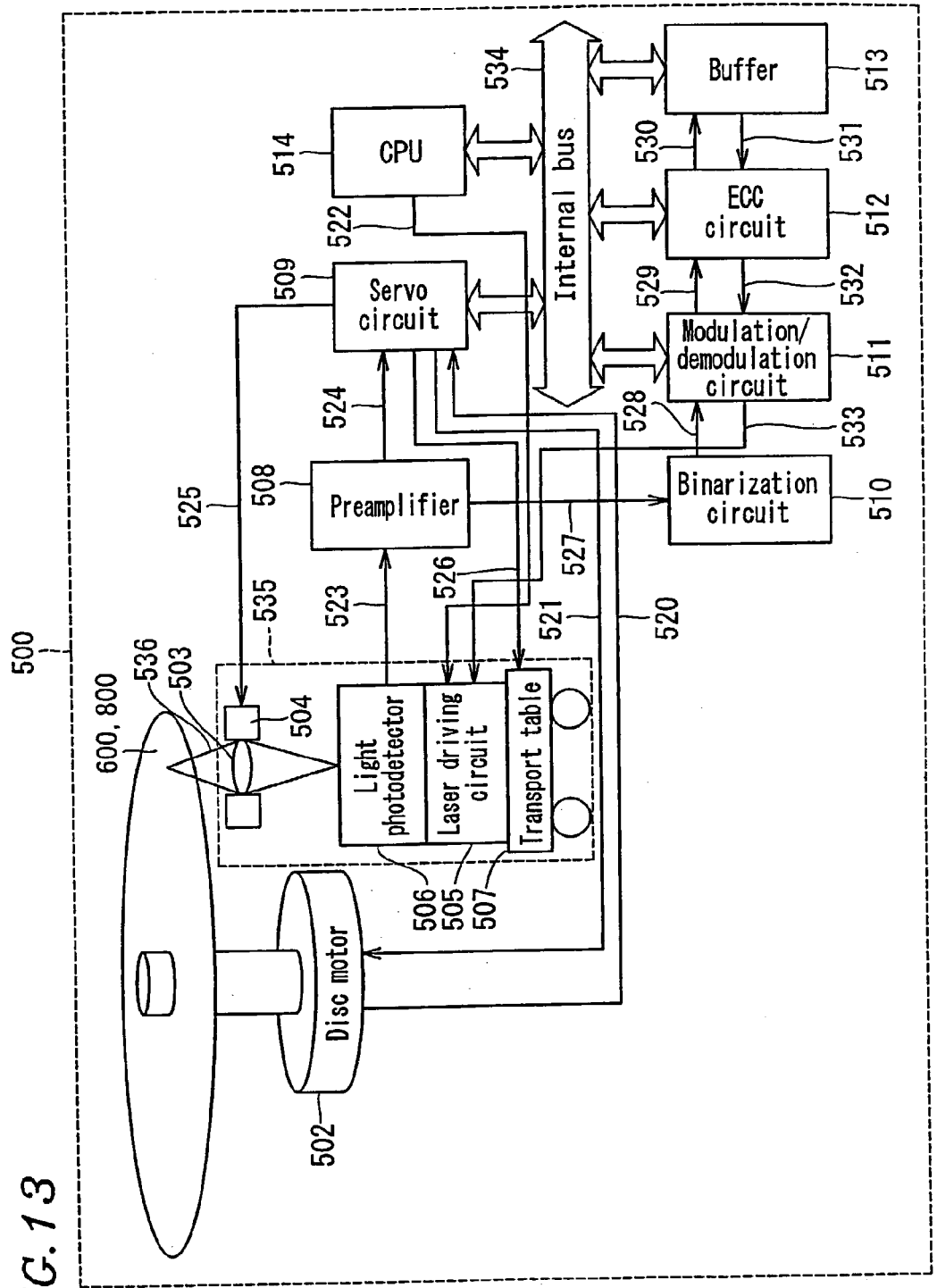
FIG. 13 is a diagram showing a recording/reproduction apparatus according to Embodiment 3 of the present invention.

FIG. 13 is a block diagram showing the information recording/reproduction apparatus 500 according to Embodiment 3 of the present invention. The information recording/reproduction apparatus 500 comprises a disc motor 502, a preamplifier 508, a servo circuit 509, a binarization circuit 510, a modulation/demodulation circuit 511, an ECC circuit 512, a buffer 513, a CPU 514, an internal bus 534, and an optical head section 535. In the information recording/reproduction apparatus 500, the multi-layered information recording medium 800 is loaded. The optical head section 535 comprises a lens 503, an actuator 504, a laser driving circuit 505, a photodetector 506, and a transport table 507. Reference numeral 520 denotes a rotation detection signal. Reference numeral 521 denotes a disc motor driving signal. Reference numeral 522 denotes a laser emission permission signal. Reference numeral 523 denotes a light detection signal. Reference numeral 524 denotes a servo error signal. Reference numeral 525 denotes an actuator driving signal. Reference numeral 526 denotes a transport table driving signal. Reference numeral 527 denotes an analog data signal. Reference numeral 528 denotes a binarized data signal. Reference numeral 529 denotes a demodulated data signal. Reference numeral 530 denotes a corrected data signal. Reference numeral 531 denotes a stored data signal. Reference numeral 532 denotes an encoded data signal. Reference numeral 533 denotes a modulated data signal.

The CPU 514 functions as a control section. The CPU 514 controls the entire operation of the information recording/reproduction apparatus 500 via the internal bus 534 according to an incorporated control program. As described below, the optical head section 535 can optically write information in the multi-layered information recording medium 800 from one side of the multi-layered information recording medium 800. The optical head section 535 can optically read information from the multi-layered information recording medium 800. The CPU 514 controls execution of a defect management process using the optical head section 535 as described below.

In response to the laser emission permission signal 522 output from the CPU 514, the laser driving circuit 505 emits laser light 536 onto the multi-layered information recording medium 800. The light reflected by the multi-layered information recording medium 800 is converted by the photodetector 506 to the light detection signal 523. The light detection signal 523 is subjected to addition/subtraction in the preamplifier 508 so as to generate the servo error signal 524 and the analog data signal 527. The analog data signal 527 is A/D (analog/digital) converted by the binarization circuit 510 to the binarized data signal 528. The binarized data signal 528 is demodulated by the modulation/demodulation circuit 511 to generate the demodulated data signal 529. The demodulated data signal 529 is converted by the ECC circuit 512 to the corrected data signal 530 which does not include any error. The corrected data signal 530 is stored in a buffer 513. The servo circuit 509 outputs the actuator driving signal 525 based on the servo error signal 524, thereby feeding a servo error back to the actuator 504 for focusing control or tracking control of the lens 503. An error correction code is added by the ECC circuit 512 to the stored data signal 531 which is an output of data from the buffer 513, so as to generate the encoded data signal 532. Then, the encoded data signal 532 is modulated by the modulation/demodulation circuit 511 to generate the modulated data signal 533. The modulated data signal 533 is input to the laser driving circuit 505 so as to modulate the power of laser light.

The information recording/reproduction apparatus 500 may be used as a peripheral device for a computer, such as a CD-ROM drive or the like, along with the computer. In such a case, a host interface circuit (not shown) is additionally provided, and data is transmitted between a host computer (not shown) and the buffer 513 through a host interface bus (not shown) such as a SCSI or the like. Alternatively, if the information recording/reproduction apparatus 500 is used as a consumer device, such as a CD player or the like, along with an AV system, an AV decoder/encoder circuit (not shown) is additionally provided so as to compress a moving image or sound or decompress a compressed moving image or sound and the resultant data is transmitted between the host computer and the buffer 513.

In a reproduction operation of the information recording/reproducing apparatus 500 according to Embodiment 3 of the present invention, it is necessary to provide two processes, a process of obtaining defect management information and a process of reproducing sectors while considering replacement, in order to reproduce information recorded in the multi-layered information recording medium 800 comprising two recording layers to which defect management of the present invention is applied.

In a recording operation of the information recording/reproducing apparatus 500 according to Embodiment 3 of the present invention, it is necessary to provide, in addition to the above reproduction operation, two processes, a process of updating defect management information and a process of recording sectors while considering replacement, in order to record information in the multi-layered information recording medium 800 comprising two recording layers to which defect management of the present invention is applied.

Hereinafter, an operation of the recording/reproduction apparatus 500 of Embodiment 3 will be described, in which recording and reproduction are performed on the multi-layered information recording medium 800 of Embodiment 2 using defect management as described with reference to, mainly, FIGS. 11 and 12. A high level apparatus, such as a host computer or the like, outputs location information specifying an area which recording and reproduction are to be performed, which information is represented by a logical sector number (LSN). Physical location information on the recording medium is represented by physical sector numbers (PSNs). It is now assumed that a PSN contains a sector layer number indicating a layer in which a sector is present, and a sector number with which it is possible to identify the location of a sector in a layer in which the sector is present.

Figure 14:
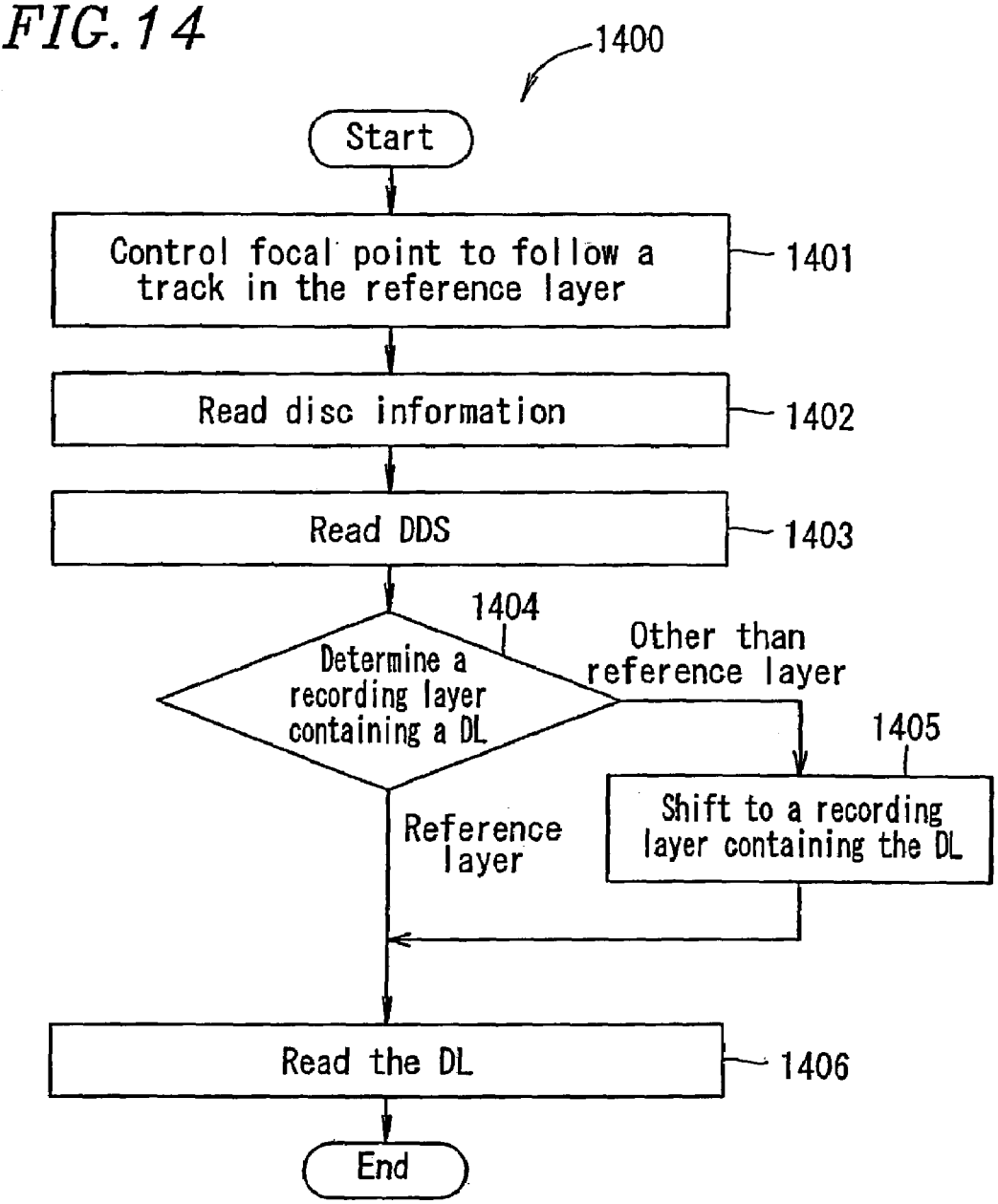
FIG. 14 is a flowchart for illustrating a procedure of obtaining defect management information in Embodiment 3 of the present invention.

FIG. 14 shows a flowchart 1400 for illustrating a procedure of obtaining defect management information in Embodiment 3 of the present invention.

At the first step of the process of obtaining defect management information, i.e., at step 1401, the CPU 514 instructs the servo circuit 509 to control the focal point of laser light so as to follow a track in a reference layer.

At step 1402, the optical head section 535 reproduces a sector which stores disc information, and the CPU 514 confirms parameters and a format which are necessary for recording/reproduction of the multi-layered information recording medium 800.

At step 1403, the optical head section 535 reproduces a DDS area 700 stored in a reference layer. The reproduced DDS data is retained in a predetermined place of the buffer 513.

At step 1404, the CPU 514 determines whether or not a DL starting layer is present in a reference layer, by referencing a DL start sector layer number 711 in the DDS data within the buffer 513. If the DL starting layer is present in the reference layer, the process proceeds to step 1406. If the DL starting layer is present in a recording layer other than the reference layer, the process proceeds to step 1405.

At step 1405, the CPU 514 instructs the servo circuit 509 to control the focal point of laser light so as to follow a track in a recording layer indicated by the DL start sector layer number 711.

At step 1406, the optical head section 535 reads a predetermined size portion of a defect list from a sector indicated by the DL start sector number 712. The read defect list is retained at a predetermined place in the buffer 513.

Figure 15:
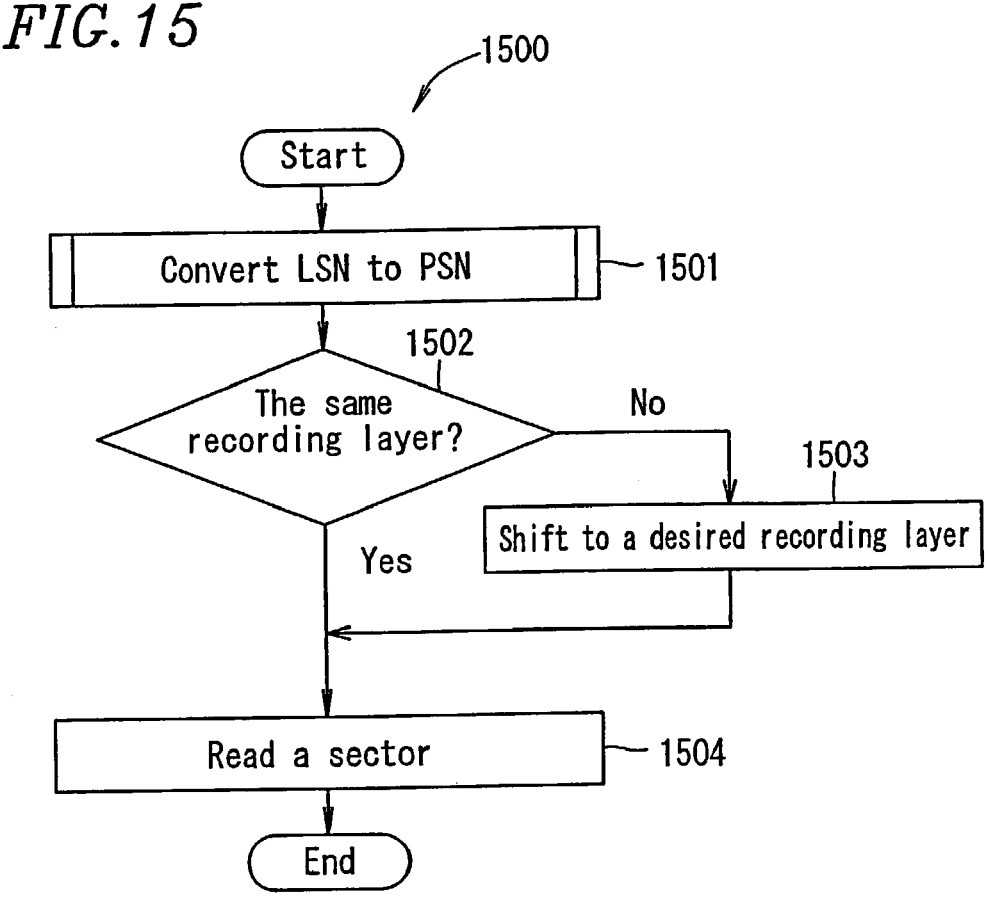
FIG. 15 is a flowchart for illustrating a reproduction procedure of sectors according to Embodiment 3 of the present invention, wherein replacement is considered.

FIG. 15 is a flowchart 1500 for illustrating a reproduction procedure of sectors according to Embodiment 3 of the present invention, wherein replacement is considered. In this reproduction process, assume that defect management information including DDS data and a defect list have already been retained in the buffer 513.

At the first step of this reproduction process, i.e., at step 1501, the CPU 514 converts LSNs, which are assigned to respective areas to be reproduced, to PSNs (detailed descriptions of this step will be described later with reference to FIG. 16).

At step 1502, the CPU 514 references to the layer number of the PSN of an area to be reproduced to determine whether or not a recording layer in which the focal point of laser light currently exists is identical to a recording layer to be reproduced. If identical, the process proceeds to step 1504; if not, the process proceeds to step 1503.

At step 1503, the CPU 514 instructs the servo circuit 509 to control the focal point of the laser light 536 so as to follow a track in a recording layer to be reproduced.

At step 1504, the optical head section 535 reproduces information recorded in a sector indicated by the PSN obtained at conversion step 1501.

Figure 16:
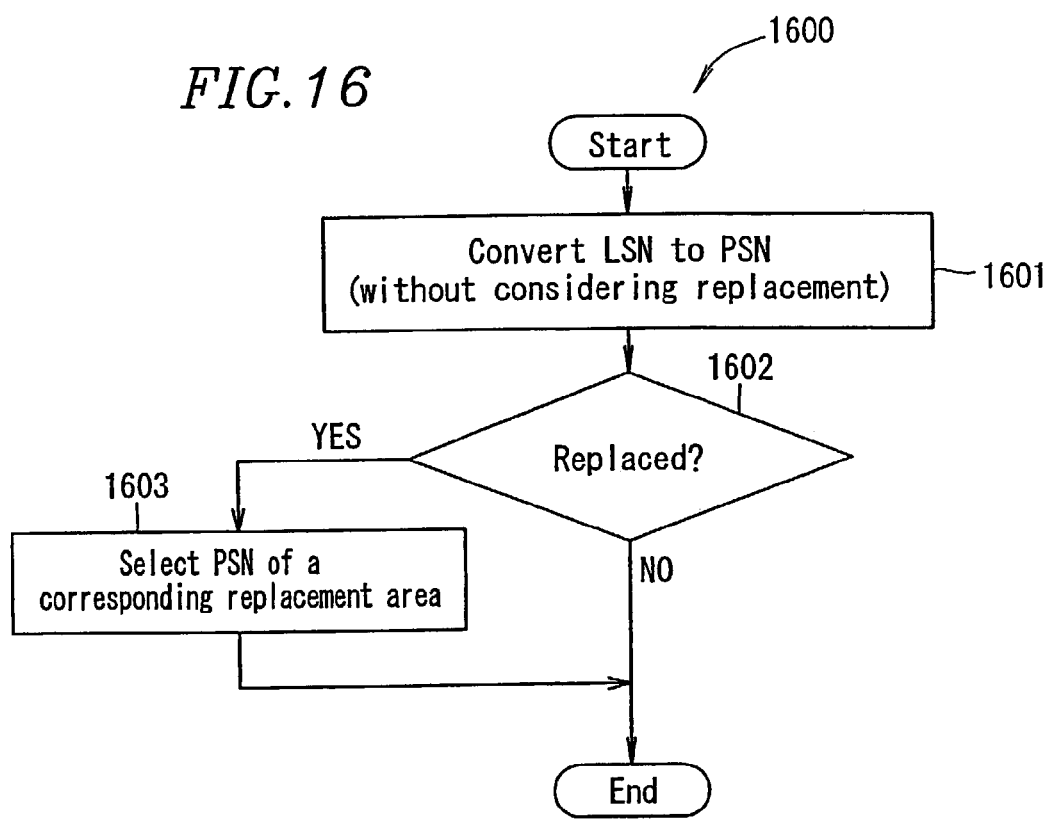
FIG. 16 is a flowchart for illustrating conversion of LSN to PSN in Embodiment 3 of the present invention.

FIG. 16 is a flowchart 1600 for illustrating a procedure of converting LSNs to PSNs (i.e., step 1501 of FIG. 15) according to Embodiment 3 of the present invention.

At the first step 1601 of this conversion process, LSN is converted to PSN without considering the presence or absence of replacement, i.e., in a manner similar to when no defective sector is present. Referring to FIG. 11, when the value of the ordinal level of a LSN to be converted is smaller than the number of sectors in the first user data area 15, PSN=(Smallest PSN in the first user data area 15)+LSN.

When the value of the order of a LSN to be converted is greater than the total number of sectors in the first user data area 15, PSN=(Smallest PSN in the second user data area 16)+LSN−(the total number of sectors in the first user data area 15).

Note that since the multi-layered information recording medium 800 of FIG. 11 has an opposite path track, a sector in the second user data area 16 to which the smallest PSN is assigned is located at the outermost perimeter portion of the second user data area 16 (i.e., being adjacent to the intermediate spare area 1002').

At step 1602, the CPU 514 references defect entry data in a defect list to determine whether or not the PSN obtained in the above-described step matches a defective sector layer number and a defective sector number stored in the defect list. If registered, the process proceeds to step 1603; if not (i.e., no replacement), the process ends.

At step 1603, the CPU 514 selects a replacement sector layer number and a replacement sector number indicated by a defect entry (i.e., a defective sector layer number and a defective sector number) indicating the PSN from defect entry data registered in the defect list.

Note that when data is reproduced from the multi-layered information recording medium 600 (FIG. 6) having no spare area, the process indicated by step 1603 is omitted or the processes indicated by steps 1602 and 1603 are omitted.

As described above, the information recording/reproduction apparatus 500 according to Embodiment 3 of the present invention can reproduce data from a multi-layered information recording medium containing a defect management area. The reproduction operation of user data which is performed after the focal point of the laser light 536 has been moved to a recording layer to be accessed, is basically the same as the reproduction operation of user data performed for a single-layered information recording medium. Thus, it is clearly appreciated that any reproduction procedure for an information recording/reproducing apparatus designed for a single-layered disc can be used.

Figure 17:
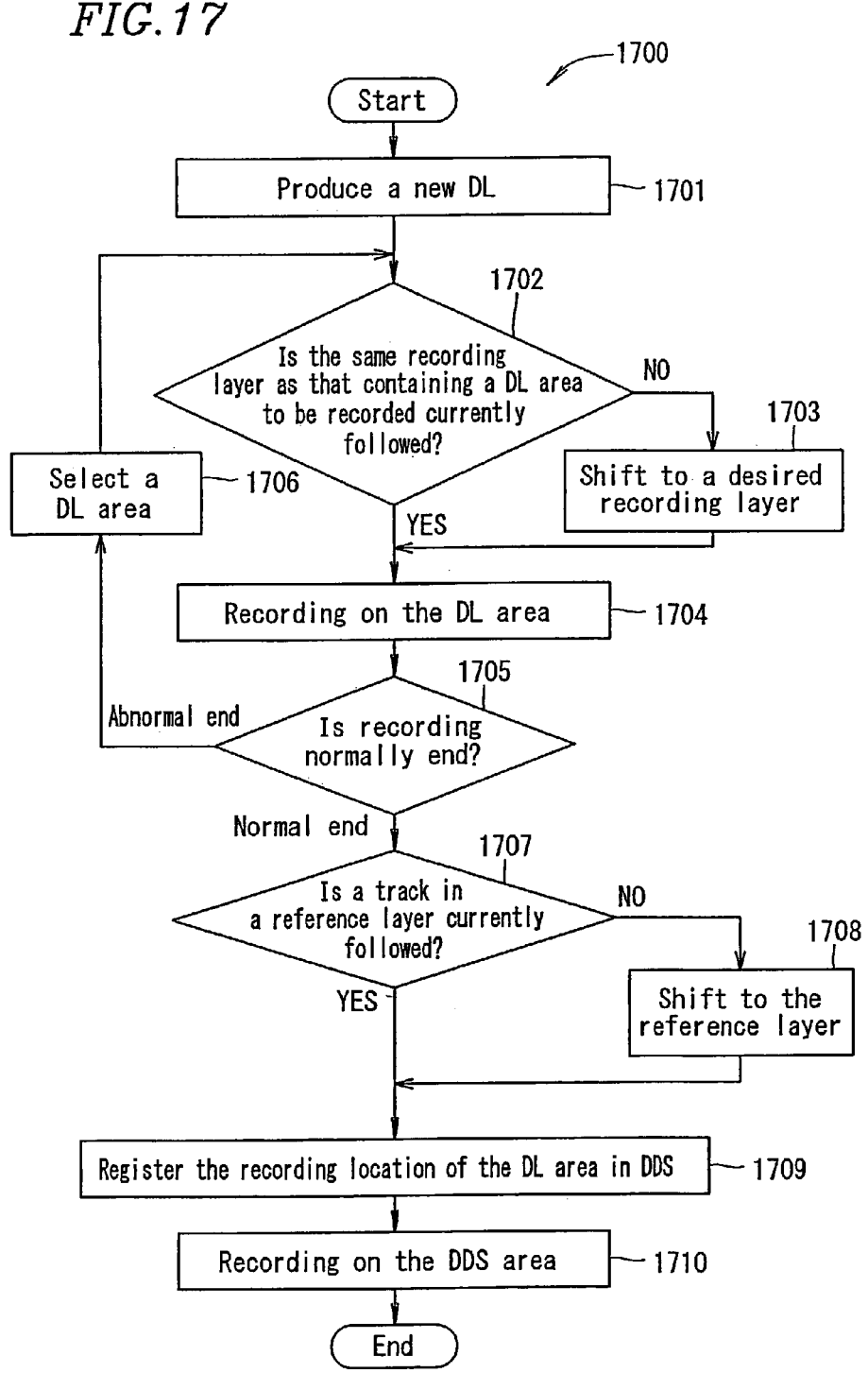
FIG. 17 is a flowchart for illustrating a procedure of updating defect management information in Embodiment 3 of the present invention.

FIG. 17 is a flowchart for illustrating a procedure of updating defect management information according to Embodiment 3 of the present invention. In this embodiment, as an example of a formatting process for a multi-layered information recording medium, initialization and updating of defect management information will be described.

At the first step 1701 of the updating process, the CPU 514 produces DDS data having predetermined definition values for a recording/reproduction apparatus and a defect list containing a DL header 720 in which the number of DL entries is set to be 0, in the buffer memory 513. In this case, a DL start sector layer number 711 and a DL start sector number 712 in a DDS 700 before a formatting process (FIG. 12) are set in a newly produced DDS.

At step 1702, it is determined whether or not a recording layer indicated by the DL start sector layer number 712 is identical to a recording layer currently followed by the focal point of the laser light 536. If identical, the process proceeds to step 1704; if not, the process proceeds to step 1703.

At step 1703, the CPU 514 instructs the servo circuit 509 to control the focal point of the laser light 536 so as to follow a track in a recording layer indicated by the DL start sector layer number 711.

At step 1704, the CPU 514 records a newly produced defect list in an area having a predetermined size which starts with a sector number indicated by the DL start sector number 712. In this case, when a defect list has been previously recorded in the area indicated by the DL start sector number 712 (e.g., the defect list 1209 (FIG. 12)), the previously recorded defect list is updated to a newly produced defect list.

At step 1705, the CPU 514 determines whether or not data is correctly recorded in a DL storing area. If correctly recorded, the process proceeds to step 1707. If not (the area is not usable), the process proceeds to step 1706. The determination of the correctness of data recording is carried out by reading data recorded in the DL storing area and judging whether or not the read data is identical to data to be recorded.

At step 1706, the CPU 514 selects another usable DL storing area. Initially, the CPU 514 determines whether or not a defect management area (or a spare DL) of a recording layer, in which data is currently recorded, contains a usable DL storing area. In the same recording layer, a DL storing area having a radial position close to that of a currently used DL storing area is selected. If no DL storing area is usable in the same recording layer, the CPU 514 selects a usable DL storing area containing an unused spare DL storing area in an adjacent recording layer. The CPU 514 records a defect list, which has the same contents as those of a defect list stored in a DL storing area which has been determined to be unusable, in a newly selected DL storing area.

At step 1707, the CPU 514 determines whether or not a track currently followed by the focal point of the laser light 536 is of the reference layer. If so, the process proceeds to step 1709; if not, the process proceeds to step 1708.

At step 1708, the CPU 514 instructs the servo circuit 509 to control the focal point of the laser light 536 so as to follow a track in the reference layer.

At step 1709, the CPU 514 records the starting PSN of a DL area (containing a DL storing area selected in step 1706), in which a defect list is recorded, in DDS data produced in the buffer memory 513. Specifically, a DL start sector layer number 712 and a DL start sector number 712 are updated.

At step 1710, the CPU 514 records the DDS data produced in the buffer memory 513 in a DDS area of a multi-layered information recording medium using the optical head section 535.

Note that in Embodiment 3, at step 1704, an area in which a defect list is recorded is not limited to a defect list storing area before a formatting process. It is clearly appreciated that, for example, all defect list storing areas before a formatting process may be made invalid, and the CPU 514 may record a defect list in a newly designated area.

Figure 18:
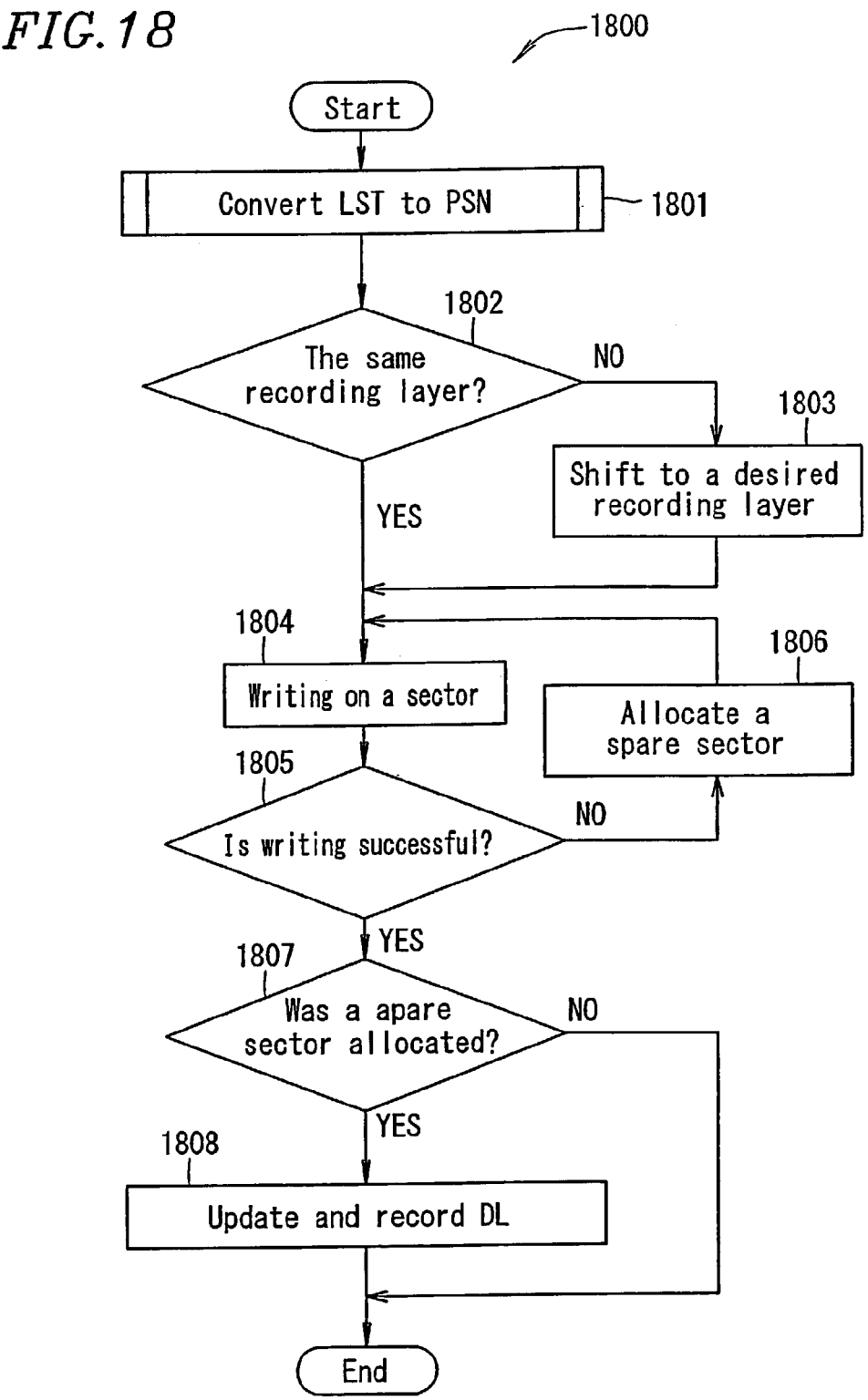
FIG. 18 is a flowchart for illustrating a recording procedure according to Embodiment 3 of the present invention, wherein replacement is considered.

FIG. 18 is a flowchart 1800 for illustrating a recording procedure according to Embodiment 3 of the present invention, wherein replacement is considered.

Figure 21:
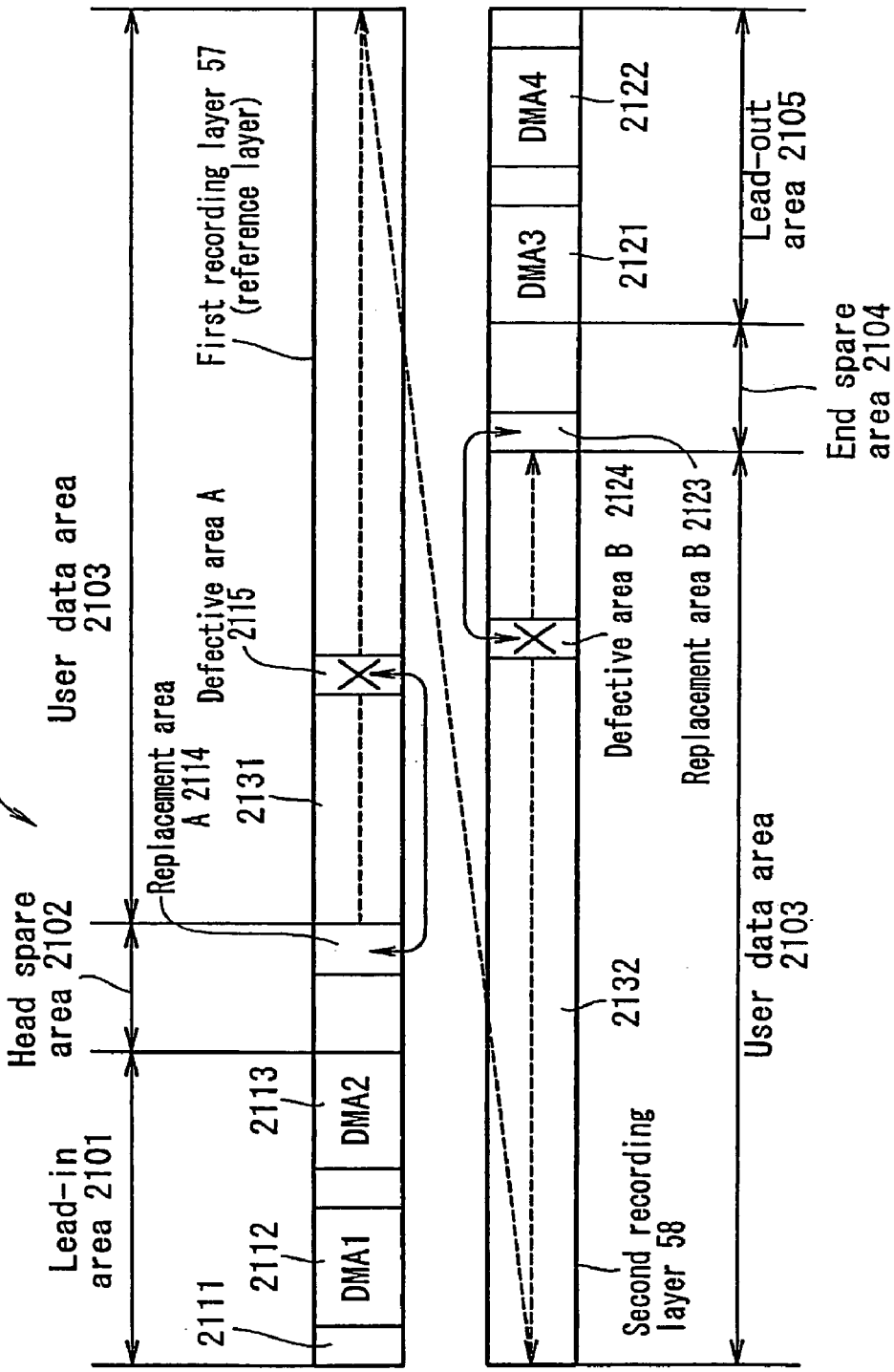
FIG. 21 is a diagram showing locations of areas in a multi-layered information recording medium according to Embodiment 5 of the present invention.

At the first step 1801 of this recording process, the CPU 514 converts LSNs, which specify sectors in which data is to be recorded, to PSNs (see FIG. 21).

At step 1802, the CPU 514 references to the layer number of a PSN to determine whether or not a recording layer currently followed by the focal point of the laser light 536 is identical to a recording layer in which data is to be recorded. If identical, the process proceeds to step 1804; if not, the process proceeds to step 1803.

At step 1803, the CPU 514 instructs the servo circuit 509 to control the focal point of the laser light 536 so as to follow a track in the recording layer in which data is to be recorded.

At step 1804, the CPU 514 records data in a sector indicated by the PSN obtained at step 1801 using the optical head section 535.

At step 1805, the CPU 514 determines whether or not the data recording was successful at step 1804. If successful, the process proceeds to step 1807; if not, the CPU 514 determines that the sector in which it is attempted to record data is defective, and the process proceeds to step 1806.

At step 1806, the CPU 514 allocates a spare sector for the sector which is determined to be defective. The CPU 514 replaces the defective area with an unused replacement area which contains a spare area at the shortest radial distance from the defective area and is present in a recording layer containing the defective area (in this case, the replacement area is a spare sector). For example, when the defective area is detected on the outer periphery of the first recording layer 53 (FIG. 11), a replacement area is allocated from the first intermediate spare area 1102 provided in the recording layer 53. If the intermediate spare area 1102 in the first recording layer 53 contains no usable replacement area, a usable replacement area is allocated from the intermediate spare area 1102' of the second recording layer 54. If the intermediate spare area 1102' of the second recording layer 54 contains no usable replacement area, a usable replacement area is allocated from the head spare area 1101 of the first recording layer 53. In such a sequence, any one of spare areas in a multi-layered information recording medium is assigned as a replacement area.

At step 1807, in the recording process, the CPU 514 determines whether or not a spare sector has been newly allocated at step 1806. If not, the recording process ends; if so, the process proceeds to step 1808.

At step 1808, the newly allocated replacement sector is registered in the defect list stored in the buffer memory 513. In this case, if the defective sector is already registered in the defect list, only a replacement sector layer number and a replacement sector number are updated. On the other hand, if a new defective sector is detected, the detected defective sector is added to the defect list.

When data is recorded in the multi-layered information recording medium 600 (FIG. 6) containing no spare area, the process indicated by step 1806 is omitted. In this case, information which is used to manage the detected defective sector is registered in the defect list.

As described above, the information recording/reproduction apparatus 500 according to Embodiment 3 of the present invention can record data in a multi-layered information recording medium having a defect management area. In the present invention, a spare sector can be allocated from a spare area provided in a recording layer different from a recording layer in which a defective sector is present. The information recording/reproduction apparatus 500 can allocate spare sectors in a manner that gives a greater weight to reduction of a seek time or in a manner that gives a greater weight to reduction of the time required for setting recording power. The recording operation of user data to the user data area which is performed after the focal point of laser light has been moved to a recording layer to be accessed, is basically the same as the recording operation of user data performed for a single-layered information recording medium. Thus, it is clearly appreciated that any recording procedure for an information recording/reproducing apparatus designed for a single-layered disc can be used.

Although in the above descriptions of the present invention, reproduction/recording of information and defect management are performed on a sector-by-sector basis, it is clearly appreciated that the present invention is applicable even when reproduction/recording of information and defect management is performed on a block-by-block basis (a block contains a plurality of sectors), or on an ECC block-by-ECC block basis (an ECC block is a unit based on which an error correction code of, for example, a DVD disc is calculated). Such a modified embodiment is made within the spirit and applicable range of the present invention, and any modified embodiment which is readily appreciated by those skilled in the art, falls within the scope of the claims of the present invention.

(Embodiment 4)

Next, a multi-layered information recording medium according to Embodiment 4 of the present invention will be described with reference to the accompanying drawings.

Figure 19:
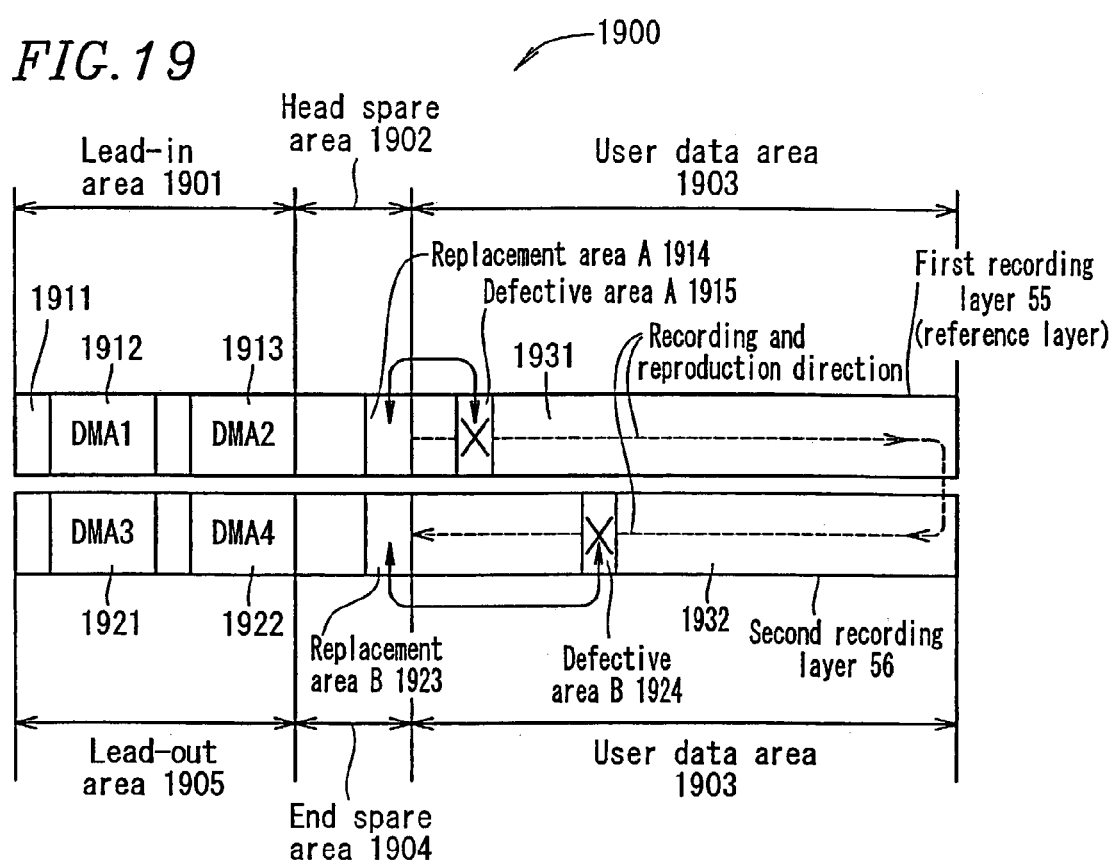
FIG. 19 is a diagram showing locations of areas in a multi-layered information recording medium according to Embodiment 4 of the present invention.

FIG. 19 is a diagram showing a multi-layered information recording medium 1900 according to Embodiment 4 of the present invention. The multi-layered information recording medium 1900 comprises two recording layers 55 and 56. The multi-layered information recording medium 1900 comprises a user data area 1903 for recording user data. In Embodiment 4 of the present invention, the upper recording layer (55) shown in FIG. 19 is referred to as a first recording layer, and the lower recording layer (56) is referred to as a second recording layer.

The first recording layer 55 is located at a predetermined distance from a surface of the multi-layered information recording medium 1900 through which data is read out (data read-out surface). The first recording layer 55 is referred to as a reference layer. This predetermined distance is equal to a distance from the data read-out surface of an optical disc comprising only one recording layer to the recording layer. A reference layer is predetermined among a plurality of recording layers.

The first recording layer 55 contains, from the inner periphery to the outer periphery along the recording/reproduction direction of the multi-layered information recording medium 1900, a lead-in area 1901, a head spare area 1902, and a first user data area 1931 which is a portion of the user data area 1903. The second recording layer 56 contains, from the outer periphery to the inner periphery along the recording/reproduction direction of the multi-layered information recording medium 1900, a second user data area 1932 which is a portion of the user data area 1903, an end spare area 1904, and a lead-out area 1905.

The lead-in area 1901 contains a control data area 1911 for storing control information for the multi-layered information recording medium 1900, and a first defect management area 1912 (DMA1) and a second defect management area 1913 (DMA2) for recording defect management information relating to a defective area. The head spare area 1902 and the end spare area 1904 contain a replacement area which may be used in place of a defective area in the user data area 1903. The lead-out area 1905 contains a third defect management area 1921 (DMA3) and a fourth defect management area 1922 (DMA4) for recording defect management information relating to a defective area. The first defect management area 1912 (DMA1), the second defect management area 1913 (DMA2), the third defect management area 1921 (DMA3), and the fourth defect management area 1922 (DMA4) each store the same defect management information. This is because by duplicately recording the same defect management information in a plurality of areas in the multi-layered information recording medium 1900, the reliability of the defect management information is improved.

The user data area 1903 contains a first user data area 1931 and a second user data area 1932. A defective area A 1915 is present in the first user data area 1931. A defective area B 1924 is present in the second user data area 1932. The defective area A 1915 is replaced with a replacement area A 1914. The defective area B 1924 is replaced with a replacement area B 1923.

The multi-layered information recording medium 1900 according to Embodiment 4 of the present invention contains four defect management areas having the same contents, thereby making it possible to obtain the reliability of defect management information. All of the four defect management areas are provided intensively on the inner periphery of the multi-layered information recording medium 1900, thereby making it possible to minimize a distance over the optical head section is moved. According to this feature, the time required for the initial process of the multi-layered information recording medium 1900 can be advantageously reduced. Further, no defect management area is provided on the outer periphery, and therefore, the entire outer periphery of the multi-layered information recording medium 1900 can be used as a user data area. Therefore, a larger user data capacity can be obtained.

A data structure of the first defect management area 1912 will be described with reference to FIG. 20. As described above, the first defect management area 1912 (DMA1), the second direct management area 1913 (DMA2), the third defect management area 1921, and the fourth direct management area 1922 each have the same defect management information. Here, only the first defect management area 1912 will be described and a description of the other defect management areas is omitted.

Figure 20:
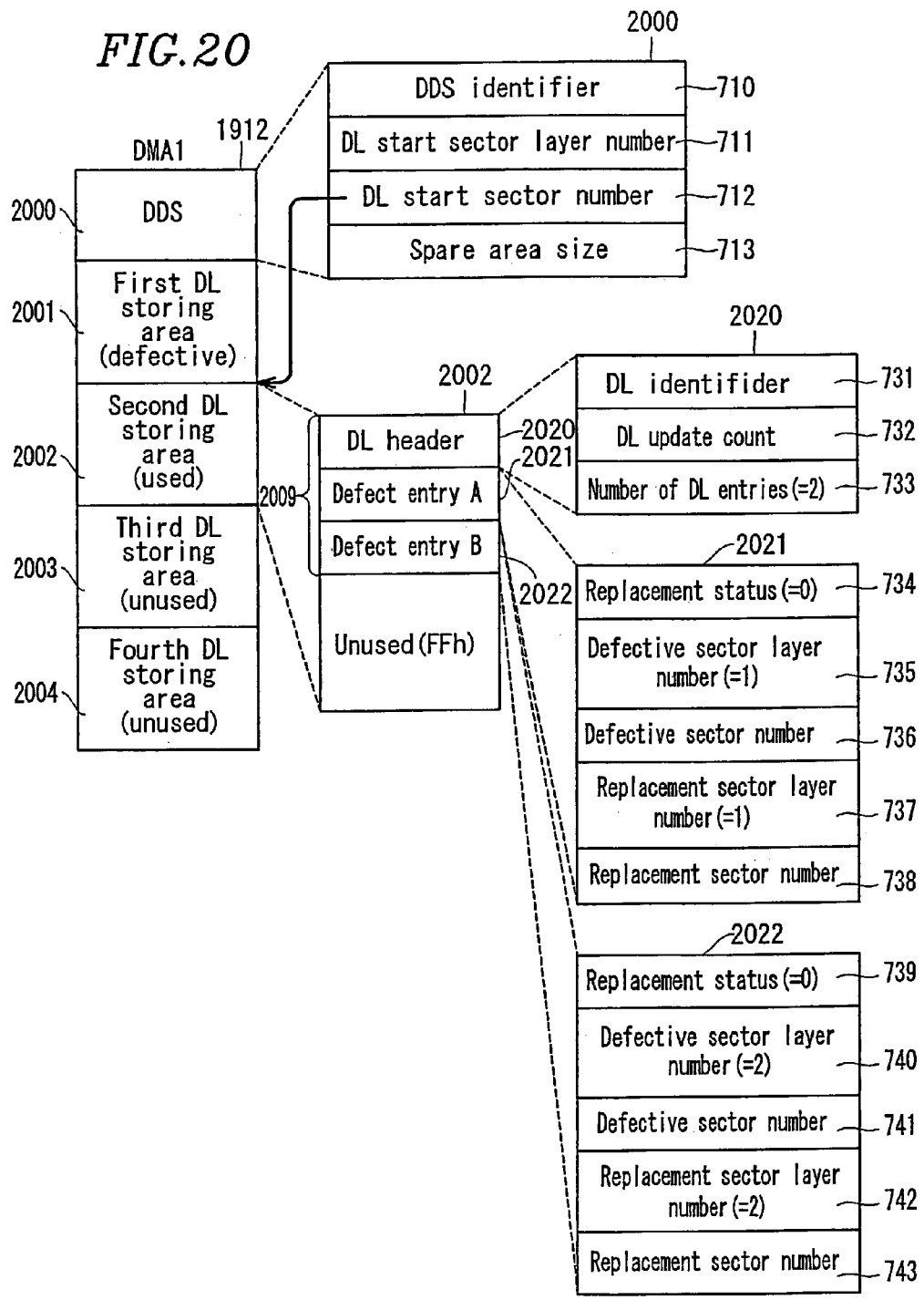
FIG. 20 is a diagram showing a data structure of a first defect management area in a multi-layered information recording medium according to Embodiment 4 of the present invention.

FIG. 20 shows a data structure of the first defect management area 1912. A DDS area 2000, first to fourth DL storing areas 2001 to 2004, and a DL header area 2020 have the same data structure as that of the DDS area 700, the first to fourth DL storing areas 701 to 704, and the DL header area 720, respectively, shown in FIG. 7, and a description thereof is omitted. Here, a defect entry A 2021 and a defect entry B 2022 contained in a defect list 2009 will be described.

The defect entry A 2021 contains defect management information relating to a defective area A 1915 (FIG. 19). The defective area A 1915 is replaced with a replacement area A 1914. Therefore, a replacement status 734 contained in the defect entry A 2021 indicates 0 which means the presence of replacement. Since the defective area A 1915 is present in the first recording layer 55, a defective sector layer number 735 indicates a value 1 which means the first recording layer 55. A defective sector number 736 indicates an identification number which permits to uniquely identify the defective area A 1915 in the first recording layer 55. Similarly, since the replacement area A 1914 is present in the first recording layer 55, a replacement sector layer number 737 indicates a value 1. A replacement sector number 738 indicates an identification number which permits to uniquely identify the replacement area A 1914 in the first recording layer 55.

The defect entry B 2022 contains defect management information relating to a defective area B 1924 (FIG. 19). The defective area B 1924 is replaced with a replacement area B 1923. Therefore, a replacement status 739 contained in the defect entry B 2022 indicates 0 which means the presence of replacement. Since the defective area B 1924 is present in the second recording layer 56, a defective sector layer number 741 indicates a value 2 which means the second recording layer 56. A defective sector number 741 indicates an identification number which permits to uniquely identify the defective area B 1924 in the second recording layer 56. Similarly, since the replacement area B 1923 is present in the second recording layer 56, a replacement sector layer number 742 indicates a value 2. A replacement sector number 743 indicates an identification number which permits to uniquely identify the replacement area B 1923 in the second recording layer 56.

As described above, according to the multi-layered information recording medium 1900 of Embodiment 4, a larger user data capacity is obtained and the performance of reading defect management information can be improved.

Note that the disc medium of Embodiment 4 is an opposite path disc in which recording and reproduction are performed from the inner periphery to the outer periphery of the first recording layer 55 and from the outer periphery to the inner periphery of the second recording layer 56. Similarly, in a parallel path disc in which recording and reproduction are performed from the inner periphery to the outer periphery in all recording layers, defective areas can be managed.

Note that in Embodiment 4, two spare areas, i.e., the head spare area 1902 and the end space area 1904 are provided in the multi-layered information recording medium 1900, however, either or both of them may be omitted.

Note that in Embodiment 4, for the sake of simplicity, the multi-layered information recording medium 1900 having two recording layers has been described, however, even in the case of a multi-layered information recording medium having at least three recording layers, the above-described effect is obtained if a defect management area is provided on the inner periphery of a reference layer and the inner periphery of a recording layer other than the reference layer.

In the case of a multi-layered information recording medium having at least three recording layers, a defect management area may be provided on the inner peripherys of all recording layers other than the reference layer.

(Embodiment 5)

Next, a multi-layered information recording medium according to Embodiment 5 of the present invention will be described with reference to the accompanying drawings.

FIG. 21 is a diagram showing a multi-layered information recording medium 2100 according to Embodiment 5 of the present invention. The multi-layered information recording medium 2100 comprises two recording layers 57 and 58. The multi-layered information recording medium 2100 contains a user data area 2103 for recording user data. The user data area 2103 straddles a boundary of the first and second recording layers 57 and 58. In Embodiment 5 of the present invention, the upper recording layer (57) shown in FIG. 21 is referred to as a first recording layer, and the lower recording layer (58) is referred to as a second recording layer.

The first recording layer 57 is located at a predetermined distance from a surface of the multi-layered information recording medium 2100 through which data is read out (data read-out surface). The first recording layer 57 is referred to as a reference layer. This predetermined distance is equal to a distance from the data read-out surface of an optical disc comprising only one recording layer to the recording layer. A reference layer is predetermined among a plurality of recording layers.

The first recording layer 57 contains, from the inner periphery to the outer periphery along the recording/reproduction direction of the multi-layered information recording medium 2100, a lead-in area 2101, a head spare area 2102, and a first user data area 2131 which is a portion of the user data area 2103. The second recording layer 58 contains, from the inner periphery to the outer periphery along the recording/reproduction direction of the multi-layered information recording medium 2100, a second user data area 2132 which is a portion of the user data area 2103, an end spare area 2104, and a lead-out area 2105.

The lead-in area 2101 contains a control data area 2111 for storing control information for the multi-layered information recording medium 2100, and a first defect management area 2112 (DMA1) and a second defect management area 2113 (DMA2) for recording defect management information relating to a defective area. The head spare area 2102 and the end spare area 2104 contain a replacement area which may be used in place of a defective area in the user data area 2103. The lead-out area 2105 contains a third defect management area 2121 (DMA3) and a fourth defect management area 2122 (DMA4) for recording defect management information relating to a defective area. The first defect management area 2112 (DMA1), the second defect management area 2113 (DMA2), the third defect management area 2121 (DMA3), and the fourth defect management area 2122 (DMA4) each store the same defect management information. This is because by duplicately recording the same defect management information in a plurality of areas in the multi-layered information recording medium 2100, the reliability of the defect management information is improved.

The user data area 2103 contains a first user data area 2131 and a second user data area 2132. A defective area A 2115 is present in the first user data area 2131. A defective area B 2124 is present in the second user data area 2132. The defective area A 2115 is replaced with a replacement area A 2114. The defective area B 2124 is replaced with a replacement area B 2123.

The multi-layered information recording medium 2100 according to Embodiment 5 of the present invention contains defect management areas on the inner periphery in the first recording layer 57 while containing direct management areas on the outer periphery in the second layer 58, thereby dramatically improving the possibility that any direct management area on either the inner periphery or the outer periphery can be used for reproduction even if a stain (e.g., a fingerprint or the like) or a scratch is present on the multi-layered information recording medium 2100; and making it possible to obtain the reliability of defect management information. Defect management areas are provided on only one of the inner periphery and the outer periphery of each recording layer, thereby obtaining a larger usable area as a user data area. Therefore, a larger user data capacity can be obtained.

A data structure of the defect management area in Example 5 is the same as that of Example 4 described with reference to FIG. 20, and a description thereof is omitted.

As described above, according to the multi-layered information recording medium 2100 of Embodiment 5, the reliability of defect management information can be improved while a larger user data capacity is obtained.

Note that the disc medium of Embodiment 5 is a parallel path disc in which recording and reproduction are performed from the inner periphery to the outer periphery of the first recording layer 57 and from the inner periphery to the outer periphery of the second recording layer 58. Similarly, in an opposite path disc in which recording and reproduction are performed from the inner periphery to the outer periphery in the recording layer 57 and from the outer periphery to the inner periphery in the recording layer 58, defective areas can be managed.

Note that in Embodiment 5, two spare areas, i.e., the head spare area 2102 and the end space area 2104 are provided in the multi-layered information recording medium 2100, however, either or both of them may be omitted. If none of the spare areas are present in the multi-layered information recording medium 2100, a defect list is used to manage information relating to a defective area with no replacement area allocated.

Note that in Embodiment 5, for the sake of simplicity, the multi-layered information recording medium 2100 having two recording layers has been described, however, even in the case of a multi-layered information recording medium having at least three recording layers, the above-described effect is obtained if a defect management area is provided on the inner periphery of a reference layer and the inner periphery of a recording layer other than the reference layer.

(Embodiment 6)

Next, a multi-layered information recording medium according to Embodiment 6 of the present invention will be described with reference to the accompanying drawings.

Figure 22:
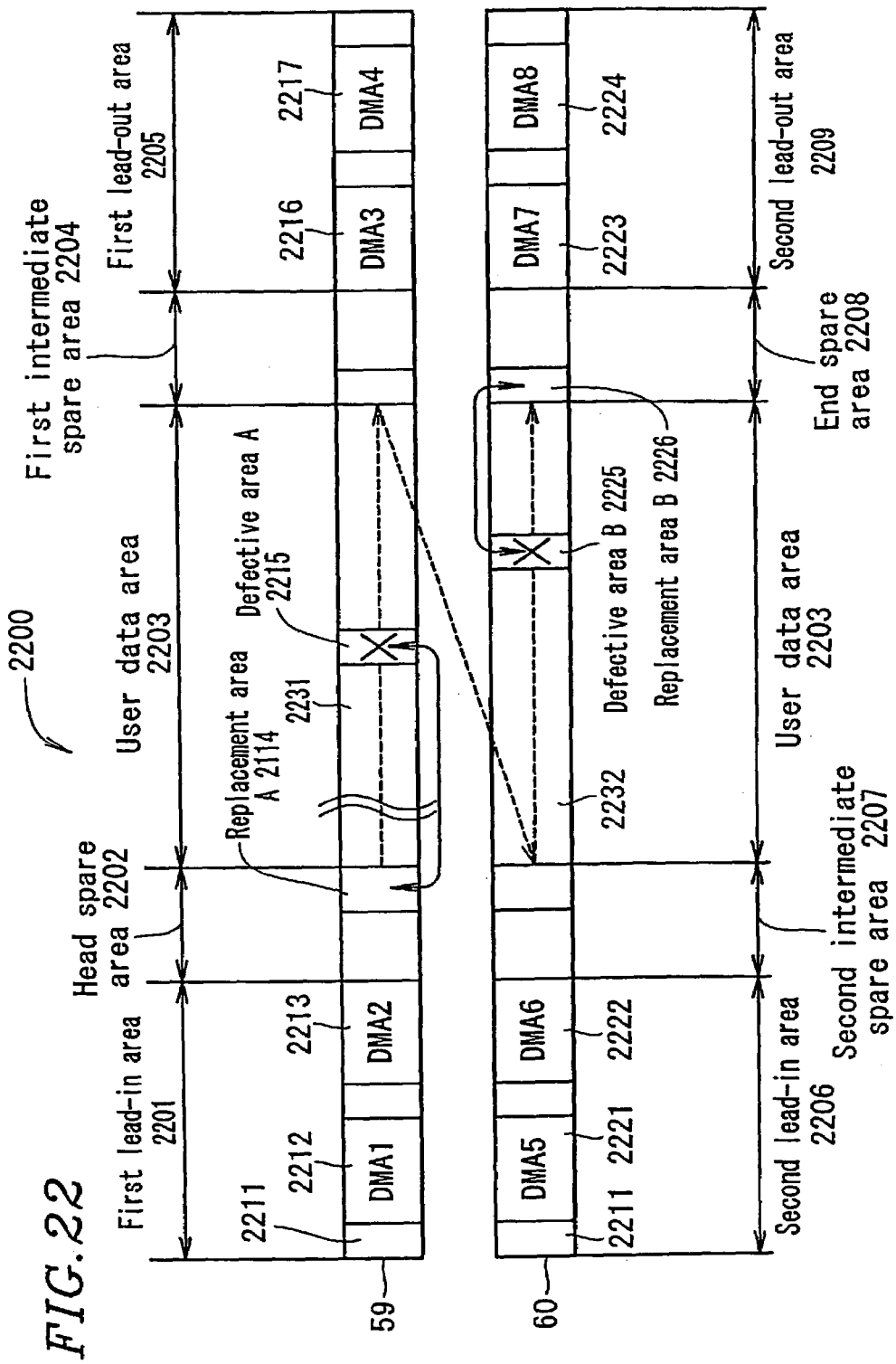
FIG. 22 is a diagram showing locations of areas in a multi-layered information recording medium according to Embodiment 6 of the present invention.

FIG. 22 is a diagram showing a multi-layered information recording medium 2200 according to Embodiment 6 of the present invention. The multi-layered information recording medium 2200 comprises two recording layers 59 and 60. The multi-layered information recording medium 2200 contains a user data area 2203 for recording user data. The user data area 2203 straddles a boundary of the first and second recording layers 59 and 60. In Embodiment 6 of the present invention, the upper recording layer (59) shown in FIG. 21 is referred to as a first recording layer, and the lower recording layer (60) is referred to as a second recording layer.

The first recording layer 59 is located at a predetermined distance from a surface of the multi-layered information recording medium 2200 through which data is read out (data read-out surface). The first recording layer 59 is referred to as a reference layer. This predetermined distance is equal to a distance from the data read-out surface of an optical disc comprising only one recording layer to the recording layer. A reference layer is predetermined among a plurality of recording layers.

The first recording layer 59 contains, from the inner periphery to the outer periphery along the recording/reproduction direction of the multi-layered information recording medium 2200, a lead-in area 2201, a head spare area 2202, a first user data area 2231 which is a portion of the user data area 2203, a first intermediate spare area 2204, and a first lead-out area 2205. The second recording layer 60 contains, from the inner periphery to the outer periphery along the recording/reproduction direction of the multi-layered information recording medium 2200, a second lead-in area 2206, a second intermediate spare area 2207, a second user data area 2232 which is a portion of the user data area 2203, an end spare area 2208, and a second lead-out area 2209.

The first lead-in area 2201 contains a control data area 2211 for storing control information for the multi-layered information recording medium 2200, and a first defect management area 2212 (DMA1) and a second defect management area 2213 (DMA2) for recording defect management information relating to a defective area. The head spare area 2202, the first spare area 2204, the second spare area 2207, and the end spare area 2104 contain a replacement area which may be used in place of a defective area in the user data area 2203. The first lead-out area 2205 contains a third defect management area 2216 (DMA3) and a fourth defect management area 2217 (DMA4) for recording defect management information relating to a defective area. Similar to the first lead-in area 2201, the second lead-in area 2206 contains a control data area 2211 for storing control information for the multi-layered information recording medium 2200, and a fifth defect management area 2221 (DMA5) and a sixth defect management area 2222 (DMA6) for recording defect management information relating to a defective area. Similar to the first lead-out area 2205, the second lead-out area 2209 contains a seventh defect management area 2223 (DMA7) and an eighth defect management area 2224 (DMA8) for recording defect management information relating to a defective area. The first defect management area 2212 (DMA1), the second defect management area 2213 (DMA2), the third defect management area 2216 (DMA3), the fourth defect management area 2217 (DMA4), the fifth defect management area 2221 (DMA5), the sixth defect management area 2222 (DMA6), the seventh defect management area 2223 (DMA7), and the eighth defect management area 2224 (DMA8) each store the same defect management information. This is because by duplicately recording the same defect management information in a plurality of areas in the multi-layered information recording medium 2200, the reliability of the defect management information is improved.

The user data area 2203 contains a first user data area 2231 and a second user data area 2232. A defective area A 2215 is present in the first user data area 2231. A defective area B 2225 is present in the second user data area 2232. The defective area A 2215 is replaced with a replacement area A 2214. The defective area B 2225 is replaced with a replacement area B 2226.

The multi-layered information recording medium 2200 according to Embodiment 6 of the present invention contains defect management areas on the inner periphery and the outer periphery in both the first recording layer 59 and the second recording layer 60, thereby making it possible to obtain the reliability of defect management information. For example, the possibility that any direct management area on either the inner periphery or the outer periphery can be used for reproduction even if a stain (e.g., a fingerprint or the like) or a scratch is present on the multi-layered information recording medium 2100, is dramatically improved, thereby enhancing the reliability of defect management information. On the other hand, if a control circuit or an optical system is affected by variations in temperature inside a recording/reproduction apparatus, the degradation of the recording/reproduction apparatus over time, or the like, the ability of the apparatus to perform recording and reproduction with respect to a specific recording layer may be lowered. In such a situation, by storing a direct management area in all recording layers, it is possible to improve the reliability of defect management information.

A data structure of the defect management area in Example 6 is the same as that of Example 4 described with reference to FIG. 20, and a description thereof is omitted.

As described above, according to the multi-layered information recording medium 2200 of Embodiment 6, the reliability of defect management information can be significantly improved.

Note that the disc medium of Embodiment 6 is a parallel path disc in which recording and reproduction are performed from the inner periphery to the outer periphery of the first recording layer 59 and from the inner periphery to the outer periphery of the second recording layer 60. Similarly, in an opposite path disc in which recording and reproduction are performed from the inner periphery to the outer periphery in the recording layer 59 and from the outer periphery to the inner periphery in the recording layer 60, defective areas can be managed.

Note that in Embodiment 6, four spare areas, i.e., the head spare area 2202, the first intermediate spare area 2204, the second intermediate spare area 2207, and the end space area 2208, are provided in the multi-layered information recording medium 2200, however, any or all of them may be omitted. If none of the spare areas are present in the multi-layered information recording medium 2200, a defect list is used to manage information relating to a defective area with no replacement area allocated.

Note that in Embodiment 6, for the sake of simplicity, the multi-layered information recording medium 2200 having two recording layers has been described, however, even in the case of a multi-layered information recording medium having at least three recording layers, the above-described effect is obtained if a defect management area is provided on the inner periphery and the outer periphery of a reference layer and the inner periphery and the outer periphery of a recording layer other than the reference layer.

According to the multi-layered information recording medium of the present invention, control information areas, such as an area for storing recording and reproduction parameters for the multi-layered information recording medium, an area for storing information relating to defect management, or the like, is provided in a single recording layer, thereby making it possible to access control information at high speed.

According to the multi-layered information recording medium of the present invention, all defect management information for all recording layers is stored in a single recording layer, thereby making it possible to access defect management information at high speed.

According to the multi-layered information recording medium of the present invention, a spare defect list storing area is provided in a recording layer other than a recording layer storing defect management information, thereby making it possible to improve the reliability of defect management information.

According to the multi-layered information recording medium of the present invention, a disc definition structure area containing information indicating the location of a defect list and a spare defect list area which may store the defect list are located at substantially the same radial positions, thereby making it possible to access the defect list at high speed.

According to the multi-layered information recording medium of the present invention, all defect lists in all recording layers are managed in a unified manner, thereby making it possible to efficiently use a defect list area even if the incidence of defective areas varies between each recording layer.

According to the multi-layered information recording medium of the present invention, a detected defective area is replaced with a spare area in any recording layer, thereby making it possible to effectively use spare areas and improve the reliability of data.

According to the multi-layered information recording medium of the present invention, a defect management area is provided on one of the inner periphery and the outer periphery of each recording layer, thereby making it possible to obtain a larger user data capacity.

According to the information reproduction method and the information reproduction apparatus of the present invention, it is possible to reproduce information from a multi-layered information recording medium containing defect management information relating to a plurality of recording layer.

According to the information recording method and the information recording apparatus of the present invention, it is possible to record information in a multi-layered information recording medium containing defect management information relating to a plurality of recording layer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multi-layered information recording medium, comprising:
   a plurality of recording layers;
   a user data area for recording user data, provided in at least two of the plurality of recording layers;
   a plurality of defect management areas provided in a first layer, each of the plurality of defect management areas having a plurality of defect list storing areas for storing a corresponding defect list which is information used to manage at least one defective area when the at least one defective area is detected in the user data area; and
   a plurality of spare defect management areas provided in a second layer other than the first layer,
   wherein a defect list is stored in a spare area defect list storing area of a corresponding spare defect management area among the plurality of spare defect management areas in the second layer only when all the defect list storing areas of the defect management areas of the first layer are unusable.

2. A multi-layered information recording medium according to claim 1, wherein the plurality of defect management areas further includes a defect list location information storing area for storing defect list location information indicating the location where the defect list is stored, and the defect list location information storing area is provided in one of the plurality of recording layers which is predetermined as a reference layer.

3. A multi-layered information recording medium according to claim 2, wherein the reference layer is one of the plurality of recording layers which is located at a predetermined distance from a data read-out surface of the multi-layered information recording medium.

4. A multi-layered information recording medium according to claim 2, wherein the reference layer is one of the plurality of recording layers which is located at the shortest distance from the data read-out surface of the multi-layered information recording medium.

5. A multi-layered information recording medium according to claim 2, wherein the reference layer is one of the plurality of recording layers which is located at the longest distance from the data read-out surface of the multi-layered information recording medium.

6. A multi-layered information recording medium according to claim 2, wherein the defect list storing area is provided in one of the plurality of recording layers, and
the defect list location information indicates the location of the defect list storing area by a layer number for distinguishing the plurality of recording layers from each other and an intralayer address for indicating a position in each of the plurality of recording layers.

7. A multi-layered information recording medium according to claim 1, wherein the defect list indicates the location of the detected at least one defective area by a layer number for distinguishing the plurality of recording layers from each other and an intralayer address for indicating a position in each of the plurality of recording layers.

8. A multi-layered information recording medium according to claim 1, further comprising a spare area containing at least one replacement area, wherein when at least one defective area is detected in the user data area, the at least one replacement area may be used in place of the at least one defective area.

9. A multi-layered information recording medium according to claim 8, wherein when the defective area is replaced with the replacement area, the defect list indicates the location of the defective area and the location of the replacement area by respective layer numbers for distinguishing the plurality of recording layers from each other and respective intralayer addresses for indicating a position in each of the plurality of recording layers.

10. A multi-layered information recording medium according to claim 1, wherein
logical addresses are assigned to the user data area,
an area of the user data area to which the smallest logical address is assigned is provided in the recording layer in which the defect list storing area is provided,
an area of the user data area to which the greatest logical address is assigned is provided in the recording layer in which the spare defect list storing area is provided,
the defect management area is adjacent to the area to which the smallest logical address is assigned, and
the spare defect management area is adjacent to the area to which the greatest logical address is assigned.

11. A multi-layered information recording medium according to claim 1, wherein the defect management area and the spare defect list storing area are located at the same radial positions in the multi-layered information recording medium.

12. A multi-layered information recording medium according to claim 1, wherein the defect management area further comprises a defect list location information storing area for storing defect list location information indicating the location where the defect list is stored among the plurality of defect list storing areas and the plurality of spare defect list storing areas.

* * * * *